United States Patent [19]
Okada et al.

[11] Patent Number: 6,144,960
[45] Date of Patent: *Nov. 7, 2000

[54] SOFTWARE REGISTERING/MANAGING SYSTEM AND METHOD THEREOF

[75] Inventors: Toshiro Okada; Hiroshi Oki; Shinji Kamata; Takashi Hara; Toshiya Yamazaki, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/724,675

[22] Filed: Oct. 1, 1996

[30] Foreign Application Priority Data

Oct. 5, 1995 [JP] Japan .................................. 7-258506

[51] Int. Cl.⁷ .................................................. G06F 17/00
[52] U.S. Cl. .......................... 707/10; 709/227; 709/249; 709/250; 709/302
[58] Field of Search ....................... 381/2–27; 379/91.01, 379/221; 705/14; 395/50–62; 707/1–206, 100; 709/1–400

[56] References Cited

U.S. PATENT DOCUMENTS

| | | | |
|---|---|---|---|
| 5,357,563 | 10/1994 | Hamilton et al. | 379/91 |
| 5,386,458 | 1/1995 | Nair et al. | 379/91 |
| 5,550,816 | 8/1996 | Hardwick et al. | 370/60 |
| 5,620,182 | 4/1997 | Rossides | 273/138.2 |
| 5,682,429 | 10/1997 | Cordery et al. | 380/25 |
| 5,701,484 | 12/1997 | Artsy | 395/683 |
| 5,710,887 | 1/1998 | Chelliah et al. | 395/226 |
| 5,859,969 | 1/1999 | Oki et al. | 709/200 |

OTHER PUBLICATIONS

U. S. application No. 08/585,017 Oki et al. filed Jan. 11, 1996.

Primary Examiner—Thomas G. Black
Assistant Examiner—David Jung
Attorney, Agent, or Firm—Staas & Halsey LLP

[57] ABSTRACT

A club with a conference room function and a remote installation system (RIS) function is displayed on a terminal of a user through a network. A plurality of clubs are hierarchically structured. A user uploads a software program that he has created to one of the clubs so as to publish the software program for which a fee may be or may not be charged. A supervisor of a club links to a software program being uploaded to another club or moves the authority of the club to another club. Another user can download a desired software program from any club. A supervisor of each club can flexibly manage software programs registered in the club.

28 Claims, 32 Drawing Sheets

```
RIS_SENDENV (TERMINAL → HOST)
  RID=1,
  MID=1,
  TIME=1994/08/94/12/20/20,
  MACHINE:
    MODEL=1,
    OS=1,
    DRV:
      DRVKIND=HS,
      HDINF:
        HDID=0,
        PARTINF:
          PARTNO=1,
          CAPACITY=400000,
          VACANT=200000,
          OSNAME=MSDOS2,
          DRVNAME=D,
          PRIORITY=?
        ;
        PARTINF:
          PARTNO=2,
          CAPACITY=500000,
          VACANT=300000,
          OSNAME=MSDOS,
          DRVNAME=E,
          PRIORITY=?
        ;
      ;
      DRVKIND=HS,
      HDINF:
        HDID=1,
        PARTINF:
          PARTNO=1,
          CAPACITY=500000,
          VACANT=200000,
          OSNAME=MSDOS,
          DRVNAME=F,
          PRIORITY=?
        ;
        PARTINF:
          PARTNO=2,
          CAPACITY=700000,
          VACANT=300000,
          OSNAME=MSDOS,
          DRVNAME=G,
          PRIORITY=?
        ;
      ;
      DRVKIND=F2,
      DRVKIND=F2,
      DRVKIND=C
    ;
    SOUKODIR=D:¥RIS¥SOUKO,    ◄ — — — DISIGNATE DIRECTORY WITH
    WINDIR=D:¥WINDOWS,                THIS EXPRESSION
    MEM
      WMEM=8000000,
      TPA=400000
    ;
  ;
  MPSWD="1234"
```

FIG. 6

```
RIS_CHKENV⦀RESP (HOST ⟶ TERMINAL)
  RID=6,
  JUDGE=1,
  STRPLACE:
    SOFT=5,
    WORKDIR="D:¥RIS¥SOUKO",
    SOUKODIR="D:¥RIS¥SOUKO¥FM"    ◀ --- WITH SUBDIRECTORY
  ;
  WORKSIZ=309000,
  SOUKOSIZ=549
```

FIG. 7

| | |
|---|---|
| (COMMAND) | RIS_KEYLIST |
| (RESPONSE) | RIS_KEYLIST⦀RESP<br>KEYLIST:<br>KEY=1,<br>NAME="OS/BASIC SOFTWARE"<br>KEY=2,<br>NAME="PROGRAMMING LANGUAGES",<br>KEY=3<br>NAME="GAMES" |
| (COMMAND) | RIS_KEYLIST<br>KEY=3 |
| (RESPONSE) | RIS_KEYLIST⦀RESP<br>KEYLIST:<br>KEY=51,<br>NAME="RPG",<br>KEY=52,<br>NAME="ACTIONS",<br>KEY=53,<br>NAME="PUZZLE/QUIZ",<br>KEY=54,<br>NAME="SIMULATION",<br>KEY=55,<br>NAME="JOKE", |
| (COMMAND) | RIS_LIST<br>KEY=52,<br>KEY=53 |

FIG. 8

```
RIS_SENDENV
  MACHINE:
    MODEL=1,   (OBTAINED WHEN TERMINAL SOFTWARE PROGRAM
    OS=1,                                    IS INSTALLED)
    DRV:
      DRVKIND="HS",
      HDINF:
        HDID="0",
        PARTINF:
          PARTNO="1",
          CAPACITY="50000000",
          VACANT="50000000",    (OBTAINED WHEN TERMINAL
          OSNAME="MSDOS",                ACCESSES HOST)
          DRVNAME="D",
          PRIORITY="1"
```

FIG. 10

```
RIS_CHKENV
  SOFT=5 (CHECK SOFTWARE PROGRAM CODE NUMBER 5.)

RIS_CHKENV*RESP
  CHKEXE:
    TAG="VBRJP200.DLL"        (SEARCH WHETHER OR NOT FILE VBRJP200.DLL
    CMD="ST4 D:¥WINDOWS¥SYSTEM¥¥VBRJP200.DLL"         IS PRESENT IN SYSTEM DIRECTORY)
  ;
    WORKDIR="D:¥RIS¥KOBUTA"
    SOUKODIR="D:¥RIS¥KOBUTA"
  ;
  WORKSIZ=700000,
  SOUKOSIZ=500000

RIS_CHKENV
  SOFT=5,
  RESULT:
    TAG="VBRJP200.DLL",  (FILE VBRJP200.DLL IS NOT PRESENT IN SYSTEM DIRECTORY)
    VAL="OFF"
  ;

RIS_CHKENV*RESP
  ASKCHECK:
    TAG="Q1"                       (INQUIRY DATA OF USER)
    QUERY="TO EXECUTE THIS SOFTWARE PROGRAM, VBRJP200.DLL IS REQUIRED.
           THIS FILE IS NOT FOUND IN YOUR SYSTEM. IN THIS SITUATION, SOFTWARE
           PROGRAM CANNOT BE EXECUTED. WOULD YOU LIKE TO INSTALL THE FILE?
    TYPE=0,
    ANS:
      CODE="OK"
      NAME="OK"
    ;
    ANS
      CODE="CANCEL",
      NAME="CANCEL"
    ;

RIS_CHKENV
  SOFT=5,
  RESULT:
    TAG="Q1",            (USER INPUTS "YES" FOR INSTALLING THE FILE)
    VAL="OK"

RIS_CHKENV*RESP
  JUDGE="OK"       (THE FILE CAN BE INSTALLED)

RIS_INSTALL
CNT=1,
TYPE="RIS",
STRPLACE:
  SOFT=5,
  WORKDIR="D:¥RIS¥KOBUTA",
  SOUKODIR="D:¥RIS¥KOBUTA"
  ;
```

FIG. 11

```
[DstDirs]
 1=D:¥RIS¥KOBUTA
 2=D:¥WINDOWS¥SYSTEM
[Files]
;Description,      Dst(Dir:Name), Shared
;————————————————————————
Soft2.Exe,         1:Soft2.Exe,    N
TOWNS.DRV          2:FONT.DRV      N
```
FIG. 13
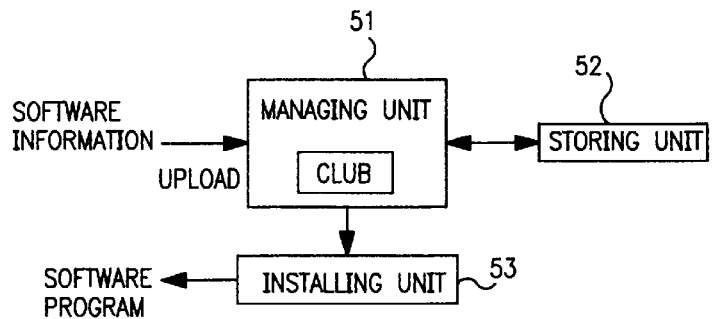
FIG. 14
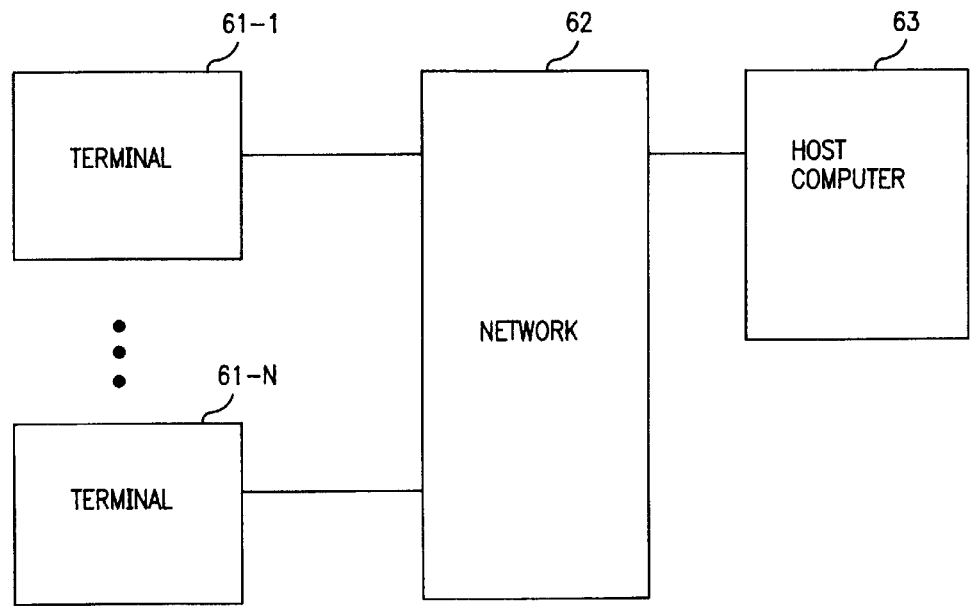
FIG. 15

COMMODITY DATABASE (SUITE PROGRAM OA-A1)—LINKED EXAMPLE
SOFTWARE PROGRAM CODE=001
UPLOAD=UID001
ORIGINAL=A
KEYWORD=JAPANESE, SUITE PROGRAM
STATUS=PUBLISHED
LINKING CLUB 1=B
KEYWORD=MACRO ENABLE, SUITE PROGRAM
STATUS=PUBLISHED
LINKING CLUB 2=C
KEYWORD=
STATUS=PERMITTED
LINKING CLUB 3=DP
KEYWORD=OA:SUITE PROGRAM, WORDPROCESSOR,
SPREADSHEET, COMPUTER COMMUNICATION
STATUS=PUBLISHED
UPLOAD INFORMATION=FILE001

(OLDTERM-C1)—EXAMPLE OF PROGRAM NOT LINKED
SOFTWARE PROGRAM CODE=003
UPLOAD=UID002
ORIGINAL=C
KEYWORD=MACRO DISABLED
STATUS=PUBLISHED
UPLOAD INFORMATION=FILE003

(NEW WORDPROCESSOR A2)—EXAMPLE OF TMP(TEMPORARY)
SOFTWARE PROGRAM CODE=905
LAST ACCESS=1995/09/20/10:15:25
UPLOAD=UID003
ORIGINAL=A
KEYWORD=CHINESE
UPLOAD INFORMATION=FILE905

FIG. 18

| | STANDARD CREATOR OF SOFTWARE PROGRAM | SUPERVISOR OF ORIGINAL CLUB | SUPERVISOR OF LINKED CLUB | SUPERVISOR OF HIGH ORDER CLUB |
|---|---|---|---|---|
| UPLOAD | ○ | | | |
| RIS(TEST) | ○ | ○ | ○ | ○ |
| PUSH | ○ | | | |
| PUBLISH | | ○ | ○ | ○ |
| PERMITION | | ○ | ○ | ○ |
| LINK | | | ○ | ○ |
| MOVE | | ○ | | |

FIG. 19

```
[name]
;NAME FOR SEARCHING SOFTWARE PROGRAM ———————— REGISTERED TO SEARCH DB
;FORMAT IS "NAME","PRONUNCIATION".BOTH NAME AND PRONUNCIATION
                                    ARE EMBEDDED WITHIN DOUBLE QUOTATION MARKS(").
"NEW WORDPROCESSOR A-2","SHINWAPUROEINI"

[version]
;UP TO 8 ASCII CHARACTERS           ———————— REGISTERED TO SOFTWARE DB
V1.2

[oldversion]
;REGISTER SOFTWARE PROGRAM OF OLD VERSION.
;FORMAT IS CHARACTER STRING OF "SOFTWARE PROGRAM CODE + VERSION".
V1.1
[type]
;FEE FOR SOFTWARE PROGRAM IS CHARGED WHEN IT IS DOWNLOADED.
;FREE
;   FREEWARE
SHARE
;   SHAREWARE
;PRODUCT
;   PRODUCT

[price]
;PRICE IS DENOTED WITHOUT CURRENCY SYMBOL "¥" AND COMMAS.
3000

[machine]
;FORMAT IS MACHINE ID AND MACHINE NAME  ———————— REGISTERED TO INSTALL DB
;HOST REQUIRES ONLY MACHINE ID. MACHINE NAME IS USED FOR CONVENIENCE OF USER.
;REMOVE SEMICOLON ONLY FOR AVAILABLE MACHINE.
TOWNS
;    TOWN SERIES
FMR
;    FMR SERIES
PC98
;    PC98 SERIES
PC-AT
;    AT COMPATIBLES
;MAC1
;    Quadra 800
;MAC2
;    LC50
```

FIG. 24

```
[os]
;SAME AS [machine]          ———— REGISTERED TO INSTALL DB
WIN31J
;  JAPANESE Windows 3.1
;NT31J
   JAPANESE Windows NT 3.1
;DOS5V
;  DOS/V Ver.5.x
;DOS5J
;  JAPANESE MS-DOS  Ver.5.0
;DOS3J
;  JAPANESE MS-DOS  Ver.3.x
;TOS
;TOWNS OS
;MACOS7
;  MacOS Ver.7.0
[key]

;FORMAT IS "KEY 1", "KEY 2",… "KEY N" THAT SHOULD BE WRITTEN ON ONE LINE.
;A PLURALITY OF KEYS CAN BE WRITTEN.    ———— REGISTERED TO SEARCH DB.
;"CHINESE"
[compression]
;COMPRESSION TYPE.
 COMPRESSION TYPE IS DESIGNATED BY CHANGING THE POSTION OF SEMICOLON.
;NONE
;  NO COMPRESSION
LHA
;  COMPRESSION BY LHA
;TGZ
;  COMPRESSION BY gnu tar + gzip
;ZIP
;  COMPRESSION BY PKZIP
[instype]
;INSTALL TYPE, SEMICOLON IS PLACED FOR OTHER THAN INVALID TYPE.
;FORMAT IS "ID [iconfile1 [inconfile2 [···] ] ]".
 RIS       icon.def
;  INSTALLED AND REGISTERED AS ICON.
 INSTALLER icon2. def
;  REGISTER INSTALL. EXE AS ICON
 DLOAD
;  DOWNLOAD
```

FIG. 25

```
[souko]
;WRITE RECOMMENDED DIRECTORY IN WHICH SOFTWARE PROGRAM IS
; STORED.  RECOMMENDED DIRECTORY PREFERABLY STARTS WITH
; @SOUKO@.
;FORMAT IS "ID DIRECTORY NAME".  "ID" STARTS WITH "P" FOLLOWED
; BY NUMBER ("Pn").
P1   @IC#SOUKO@¥ABC
P2   @WORK@
[source]
;FORMAT IS "ID FILE ExtPath mode arcsize extsize extfiles".
;ID: n of "ID: S1, .., Sn" IS SERIAL NUMBER.
;FILE:  WRITE NAME OF MAIN FILE (IN LZH FORMAT) TO BE
;  DOWNLOADED.
;ExtPath:  WRITE DIRECTORY NAME TO WHICH FILE IS
;  DECOMPRESSED.
;  SPECIAL DIRECTORY IS DESIGNATED.
; FILE NAME SHOULD BE COMPOSED OF ONLY ASCII CHARACTERS.
;mode: REPRESENTS WHETHER OR NOT TERMINAL SIDE CAN CHANGE
;     DIRECTORY IN WHICH FILE IS DECOMPRESSED.
;        M: MOVABLE      F: FIXED
;arcsize:   STORAGE CAPACITY OF ARCHIVE (bytes)
;extsize:   MINIMUM STORAGE CAPACITY OF DECOMPRESSED FILE
;            (bytes)
;    WHEN LARGE WORKING AREA IS REQUIRED IN INSTALL OPERATION,
; EXCESSIVE STORAGE CAPACITY OF arc SHOULD BE ASSIGNED.  WHEN
; LARGE WORKING AREA IS REQUIRED IN EXECUTION, EXCESSIVE
; STORAGE CAPACITY OF min SHOULD BE ASSIGNED.  HOWEVER, WHEN
; ANOTHER SOFTWARE PROGRAM IS INSTALLED, AREA MAY BECOME
; INSUFFICIENT.
;extfiles:  WRITE FILE NAMES COMPRESSED IN ARCHIVE FILE
;           REPRESENTED BY FILE WITH COMMAS ",".  ALL FILE
;           NAMES ARE NOT REQUIRED.  FILES TO BE REDUNDANTLY
;           CHECKED ON TERMINAL SIDE SHOULD BE WRITTEN.  THUS,
;           THIS FIELD IS OMISSIBLE.  ALL FILE NAMES SHOULD BE
;           WRITTEN ON ONE LINE WITHOUT CARRIAGE RETURN.
;ID   FILE            ExtPath  mode   arcsize  extsize  extfiles
 S1   NEWWP.LZH       @P1@     M      800000   2000000
*S2   NEWWPLIB.LZH    @P2@     F      7000     13000    GSWDLL.DLL
[destination]
;FORMAT IS "ID DIRECTORY NAME".  "ID" STARTS WITH "D" FOLLOWED
; BY NUMBER ("Dn").
;WRITE DIRECTORY NAME IN WHICH FILE IS DECOMPRESSED. ONLY
; SPECIAL DIRECTORY NAME.
;                       REGISTERED TO INSTALL DB.
D1   @WINSYSTEM@

[copy]
;WRITTEN ONLY WHEN FILE IS MOVED OR MODE IS CHANGED (WITHOUT
; MOVING LOCATION).
;ALTHOUGH USED ALONG WITH [destination] SECTION, FILE NAME TO
; BE MOVED (FULL PATH INCLUDING SPECIAL DIRECTORY NAME) MAY
; BE WRITTEN.
;FORMAT IS "ID @SID@¥SourcePth @DID@¥DestPath Attr".
;WHEN MODE IS CHANGED, BUT FILE IS NOT MOVED, Destination IS
'*'.
;ID: WRITE C1, C2, ..., Cn IN SUCCESSION.  IT CAN BE
; REFERENCED WITH CHECK SCRIPT.
;SID: ID WRITTEN IN [source]
;SourcePath: FILE NAME GENERATED AFTER FILE IS DECOMPRESSED
; (FILE NAME MAY INCLUDE SUBDIRECTORY).
;DID:  ID WRITTEN IN [destination].
;DestPath: FILE NAME OF MOVED LOCATION OF FILE GENERATED AFTER
;IT IS DECOMPRESSED (FILE MAY INCLUDE SUBDIRECTORY).
;    Attr: EXECUTE HIDE/RO FOR FILE MOVED (ONLY "attrib + n"
;IS EXECUTED.  "-n" IS NOT AVAILABLE.)
;    WRITTEN WITH R:RO, H:Hidden, A:Archive, S:System or
;N:None.
;    WHEN NO ATTRIBUTE IS SET, Attr FIELD CAN BE OMITTED.
;ID    Source         Destination       Attr
*C1    @S2@¥GSWDLL.DLL   @D1@¥GSWDLL.DLL    N
```

FIG. 26

```
[first]
;WHEN INSTALLED, WRITE COMMAND TO BE EXECUTED BEFORE ARCHIVE
; FILE IS DOWNLOADED (FOR EXAMPLE, FILE RENAME COMMAND).
;FORMAT IS "ID TYPE COMMAND ARGS FILES".
;ID: WRITE "Fn" (WHERE n = 1,2,3,...).
;    AS WITH "Sn" AND "Cn", WHEN "Fn" IS ASTERISKED, IT IS NOT
;    EXECUTED AS DEFAULT.
;    ONLY WHEN ACTIVE=Fn IS DESIGNATED IN CHECK SCRIPT,
;    COMMAND IS EXECUTED.
;TYPE: WRITE ONE OF S[cript], C[ommand], D[ownload], AND
;      L[ha].
;       Script:   CALL SUBROUTINE TYPE FUNCTION OF INSTALL
;                 SCRIPT. THIS FUNCTION IS CREATED ON HOST
;                 SIDE.  CURRENTLY NOT AVAILABLE.
;       Command:  SEND PREDETERMINED COMMAND WHEN TERMINAL
;                 PROGRAM IS DELIVERED (AS WITH AS ST4,
;                 fm#reso) AND EXECUTE THE COMMAND.
;                 ALTERNATIVELY, EXECUTE COMMAND IN LZH FILE
;                 SENT ALONG WITH OTHER DATA.
;       Download: DOWNLOAD AND EXECUTE PROGRAM INDIVIDUALLY.
;       Lha:      NORMALLY, INCLUDED IN Download.
;                 HOST SIDE USES Lha INSTEAD OF Download.  IN
;                 FILE FILED, ONLY *.LZH CAN BE WRITTEN (IN
;                 THIS BLOCK, PROGRAMS AND DATA ARE WRITTEN).
;       IN OTHER WORDS, THIS TYPE DESIGNATES LOCATION OF COMMAND
;       TO BE EXECUTED.  AT PRESENT TIME, "C" AND "D" ARE
;       NORMALLY USED.
;COMMAND: WRITE COMMAND TO BE EXECUTED.  AS PRECAUTIONS:
;         1) WHEN TYPE IS S, D, OR L, ONLY COMMAND NAME IS
;            WRITTEN.  IN THIS CASE, LZH IS DECOMPRESSED TO
;            WORKING DIRECTORY.  WHEN FILE IS SENT TO TERMINAL
;            WITH LZH, SINCE OTHER THAN *. lzh CANNOT BE DELETED
;            (HOST CANNOT KNOW WHAT FILE HAS BEEN DECOMPRESSED
;            WITH lha), FILE SHOULD BE DELETED WITH 'Fn'.
;         2) WHEN TYPE IS C AND FILE IS CONTAINED IN *.LZH WITH
;            DLOAD, DESIGNATE LOCATION IN WHICH FILE IS
;            DECOMPRESSED WITH VARIABLE.  WHEN FILE HAS BEEN
;            DELIVERED AS TERMINAL PROGRAM, ONLY COMMAND NAME
;            CAN BE WRITTEN (BECAUSE FILE IS WRITTEN WITH PATH).
;ARGS:   WRITE ARGUMENT OF COMMAND WITH DOUBLE QUOTATION
;        MARK("").  VARIABLE (@...@) CAN BE USED.  WITHOUT
;        ARGUMENT, SPACE IS DELIMITED WITH DOUBLE QUOTATION
;        MARK("").
;FILES:  SINCE REQUIRED FILES ARE NOT ALWAYS ONE, THEY ARE
;        DELIMITED WITH COMMAS (,).  AFTER ALL FILES ARE
;        DOWNLOADED, COMMAND IS EXECUTED.
;ID          TYPE       COMMAND       ARGS        FILES
;F1          C          BACKRIS       "WP.EXE"    BACKRIS.EXE
[last]
;WHEN INSTAL IS PERFORMED, WRITE COMMAND TO BE EXECUTED AFTER
; ICON REGISTERING COMMAND IS EXECUTED.
;FOR EXAMPLE, AUTOEXEC.BAT, CONFIG.SYS, AND WIN.INI ARE
; REWRITTEN.
;FORMAT IS THE SAME AS [first].  HOWEVER, ID IS "Ln" (WHERE
; n = 1, 2, 3,...).
;ID       TYPE      COMMAND      ARGS                    FILES
;L1       D         CHANGE       "AUTO.REG @BOOT@:¥autoexec.bat
;@S1@¥autoexec.bat"
```

FIG. 27

NEW WORDPROCESSER-A2 IS WORDPROCESSER THAT
WAS DEVELOPED WITH OUR LATEST TECHNOLOGIES
AND THAT CAN ALSO HANDLE CHINESE.

FIG. 28

NEWWP.LZH=WP.EXE+NEWWP.ICO+README.DOC
NEWWPLIB.LZH=GSWDLL.DLL

FIG. 29

```
MQ1 FILE "WP.EXE",
MA1 "NONE" then DLOAD
    else IC#SOUKO ="@ST4DIR@";
MQ2 FILE "WP.EXE";
MA2 @ST4DATE@<"1995/06/30 00:00:00" then SQ2;
    else SQ1;
SQ1 QUERY "LATEST VERSION OF SOFTWARE PROGRAM HAS BEEN INSTALLED IN YOUR MACHINE";
SA1 "RETRY" then RIS;
    "ABORT" then NG;
SQ2 FILE "GSWDLL.DLL";
SA2 "NONE" then active=S2, active=C1,RIS;
    else RIS;
```

FIG. 30

```
[ICON]
GROUP=RIS WAREHOUSE
TITLE=NEW WORDPROCESSER A2
EXE=@1C#SOUKO@¥WP.EXE
CWD=@1C#SOUKO@
WICON=@1C#SOUKO@¥NEWWP.ICO
TEXETYPE=WIN
```

FIG. 31

SOFTWARE REGISTERING/MANAGING SYSTEM AND METHOD THEREOF

BACKGROUND OF THE INVENTION

1. Field of the Invention

The present invention relates to a software registering/managing system. In particular, the present invention provides a system and method for automatically registering a software program from a user terminal to a database through a communication line and for managing registered software programs.

2. Description of the Related Art

In recent years, the number of personal computer based communication networks has grown remarkably. The users of such communication networks want to obtain software programs from the communication networks through the communication lines. However, a practical system that can automatically deliver software programs has not been accomplished at the present time. As an example of such a system, a user will send an order for a desired software program to a delivery center through his terminal. The delivery center will send the ordered software program to the user's terminal.

To accomplish automatic delivery of a software program, the applicant of the present invention has disclosed a related art reference titled "Remote Install System and Method thereof" as Japanese Patent Application Serial No. 7-1797, which was filed Jan. 10, 1995 in Japan and was not published before the priority date of the present application. Next, with reference to the accompanying drawings, the related art reference will be described.

FIG. 1 is a block diagram showing a structure of a remote install system according to the related art reference. The remote install system shown in FIG. 1 comprises a host computer 21 (that is disposed in a software delivery center), a user terminal 23, and a communication line 22 (that connects the host computer 21 and the user terminal 23). The terminal 23 is, for example, a personal computer disposed remotely from the delivery center. The user terminal is normally disposed in the house of the user. The communication line 22 is, for example, a personal computer based communication network.

The host computer 21 stores a software program group 35, a first key table 32, and a second key table 33, in respective storage regions thereof. The software program group 35 includes a plurality of software programs that can be delivered. The first key table 32 and the second key table 33 store lists of keywords used for selecting a software program from the software program group 35.

When the user requests the host computer 21 for a list of keywords from his terminal 23, the host computer 21 sends the first key table 32 and the second key table 33 one after the other to the terminal 23. A display unit 24 of the terminal 23 displays a list of keywords. The user selects a desired software program with a keyword of the list displayed on the screen of the display unit 24. The input keyword is sent to the host computer 21.

The host computer 21 displays a menu including names of software programs corresponding to the keywords to the display unit 24. The user selects a desired software program from the menu. The information corresponding to the selected software program is sent to the host computer 21. The host computer 21 extracts the content (file) of the selected software from the software program group 35 and stores it in a directory "D:¥SOUKO" for use with the software delivery, on the hard disk 25 of the terminal 23. (Note that the symbol "¥" is a Japanese JIS code representing the Japanese currency yen and is used instead of "\" (ASCII 5CH) and that "SOUKO"is a Japanese word that means a warehouse.)

At this point, an icon 37 for starting up the delivered software program is automatically registered. The icon 37 is displayed in a directory window 36 formed on the screen of the display unit 24 corresponding to the directory "D:¥SOUKO". For example, when the terminal 23 has installed WINDOWS (which is a trade mark of the Microsoft Corporation), the delivered software program is registered to WINDOWS. Thereafter, by selecting the icon 37 with an input device such as a mouse, the user can use the delivered software program.

An environment file 31 that contains operating environments of hardware devices, software tools and so forth of the terminal 23, is generated in the terminal 23 and sent to the host computer 21 when the terminal 23 accesses the host computer 21. The host computer 21 holds the received environment file 31 for each user so that the host computer 21 determines whether or not the terminal 23 can operate the software program selected by the user.

The host computer 21 provides an individual setup file 34 for each user. A set of files necessary for operating the software program selected by the user and storage locations thereof are contained in the setup file 34. The host computer 21 sends the set of files and setup file 34 to the terminal 23. Thus, the terminal 23 can automatically install the software program selected by the user.

Next, with reference to FIGS. 2 to 4, an operational flow of the delivery of a software program by the remote install system shown in FIG. 1 will be described.

In FIG. 2, a terminal 23 of a user A obtains information of the operating environment when a communication terminal software program is installed. The terminal 23 generates an environment file 38 that stores the obtained information (at step S1). At this point, the host computer 21 obtains information that takes a long time to get, or that needs to be requested from the user, such as the type of the terminal of the user, the location of the directory to which the software program is delivered, etc.

To determine an environment variable SOUKO that represents the storage location, the terminal 23 checks whether or not the hard disk 25 has an empty region of the required storage capacity. When the hard disk 25 has the required storage capacity, the terminal 23 creates a directory for the delivery on the root directory of the hard disk 25. At this point, the terminal 23 automatically creates the directory name and so forth. The user A only acknowledges this process. In other words, the user A does not need to input the directory name and so forth.

In this example, as the model name of the terminal of the user A and the directory name of SOUKO, "TOWNS" (that is an abbreviation of FM-TOWN, which is a personal computer made by the Fujitsu Limited) and "D:¥SOUKO" are written to the environment file 38, respectively. If necessary, the user can change the directory "D:¥SOUKO" to another suitable directory.

When the predetermined partition does not have sufficient storage capacity, the terminal 23 searches for another partition that has blank space with the largest storage capacity, and creates the directory for the delivery in the located partition. In practice, when the directory "D:¥SOUKO" becomes full, the terminal 23 outputs a message "THE DIRECTORY "D:¥SOUKO" IS FULL. WOULD YOU LIKE TO CHANGE THE DIRECTORY OF SOUKO TO F:¥SOUKO? (YES/NO)" on the screen of the display unit 24. When the user A enters "YES", the directory "F:¥SOUKO" becomes a new directory for the delivery. If any hard disk of the terminal 23 does not have sufficient storage capacity, the terminal 23 outputs a message "SORRY. THE STORAGE CAPACITY OF THE SYSTEM IS INSUFFICIENT. PLEASE, INCREASE THE STORAGE CAPACITY." on the screen of the display unit 24.

Next, when the terminal software program is started (namely, the terminal 23 accesses the host computer 21), the terminal 23 obtains information that may vary after the installation, such as the states of hard disks and memories (at step S2). In this example, information representing that a hard disk of the user A is designated as drive D and that the blank space is 300 MBytes, is written to the environment file 38. The content of the environment file 38 is sent to the host computer 21 by a command "RIS_SENDENV" when the user A accesses the host computer 21 (at step S3).

The host computer 21 holds the received information as an environment file 39 of the user A. The environment file 39 contains the model name of the user's terminal 23, the hard disk information HD, the storage location SOUKO, the OS (operating system) name in use on the terminal 23, and the location thereof. In this example, the environment file 39 shows that the OS of the terminal 23 of the user A is WINDOWS and that an environment variable WINDIR representing the storage location thereof is "D:¥WINDOWS".

When the terminal 23 receives a message "RIS_SENDENV*RESP OK" as a response to the command "RIS_SENDENV" from the host computer 21, the terminal 23 requests the host computer 21 for a first key list with a command "RIS_KEYLIST" (at step S4). The host computer 21 sends back along with a message "RIS_KEYLIST*RESP" the content of the first key table 32 to the terminal 23. In this example, the first key table 32 contains OS (operating system), programming languages, games, and so forth, as keywords corresponding to key numbers 1, 2, 3, and so forth.

When these keywords are displayed as a first key list on the screen of the display unit 24 (at step S5), the user A selects a first keyword from the first key list and inputs it to the terminal 23 (at step S6). Thus, the terminal 23 sends the selected key number of the first keyword along with a command "RIS_KEYLIST" that requests a second key list to the host computer 21 (at step S7). In this example, the user A selects games as the first keyword. The terminal 23 sends the key number 3 to the host computer 21.

The host computer 21 obtains a second key table 33 with a pointer stored in the first key table 32 corresponding to the received key number and sends back the contents thereof along with a message "RIS_KEYLIST*RESP" to the terminal 23.

The second key table 33 contains RPGs (role playing games), actions, puzzle/quiz, and so forth, corresponding to key numbers 51, 52, 53, and so forth.

Generally, a plurality of second key tables are provided corresponding to keywords of the first key table 32. The number of second key tables is equal to or smaller than the number of keywords of the first table 32. When the number of second key tables is smaller than the number of keywords of the first table 32, two or more keywords of the first key table 32 represent the same second key table.

When keywords of the second key table are displayed as a second key list on the screen of the display unit 24 (at step S8), the user A selects a second keyword from the second key list and inputs it to the terminal 23 (at step S9 in FIG. 3). Thus, the terminal 23 sends the key numbers of the first keyword and second keyword selected by the user A along with a command "RIS_LIST" that requests a list of software programs that correspond to these keywords to the host computer 21 (at step S10). In this example, the user A selects "actions" as the second keyword and the terminal 23 sends a key number 52 corresponding to "actions" to the host computer 21.

The host computer 21 searches the software program group 35 for software programs that correspond to the two key numbers of the first and second keywords. In this example, the first keyword and second keyword are not distinguished as searching conditions. In addition, the model of the terminal and the type of the OS are treated as default keywords. Thus, the host computer 21 searches the software program group 35 for software programs that correspond to these keywords including the first and second keywords and the default keywords. Thus, the host computer 21 prevents software programs that do not operate on TOWNS from being searched.

The host computer 21 sends along with a message "RIS_LIST*RESP" a list containing the names of software programs and software program numbers that correspond to these keywords to the terminal 23. In this example, since software programs "TETRIS" and "Pin Ball" correspond to the key number 3 of the first keyword and the key number 52 of the second keyword, the host computer 21 sends the software program numbers 5 and 30 along with their names to the terminal 23.

When the list of the software programs sent from the host computer 21 is displayed on the screen of the display unit 24 (at step S11), the user A selects a desired software program from the list and inputs a key number corresponding to the selected software program to the terminal 23 (at step S12). The terminal 23 sends the selected software program number, along with a command "RIS_CHKENV" that requests the host computer 21 to determine whether or not the environment of the user A is suitable for the operation of the selected software program, to the host computer 21 (at step S13). At this point, the user A selects "TETRIS" and the terminal 23 sends the software program number 5 corresponding to the software program to the host computer 21.

The host computer 21 prepares a check script 40 for determining whether or not the operating environment of the software program corresponding to the software program number selected by the user A accords with the environment of the terminal 23 of the user A, and performs an environment check. Since the environment check is automatically performed between an execution program of the check script 40 and the terminal software program of the terminal 23, the user A may not recognize the execution of the environment check (at step S14). When necessary, the host computer 21 may request some information from the user A.

In this example, as the operating environment of "TETRIS" selected by the user A, the OS is WINDOWS; the model of the terminal is TOWNS, PC98, and so forth; and the recommended directory (DIR) name of "TETRIS" is "TET". On the other hand, the user A's environment file 39 contains information representing that the model is TOWNS and that the OS is WINDOWS. When the operating environment of "TETRIS" is compared with the operating environment of the user A's environment file 39, it is clear that the OS and the model of the terminal 23 accord with those required for "TETRIS".

Since the check script 40 of "TETRIS" contains a command "ST4 @WINDIR@VBRJP200.DLL" for determining whether or not a file "VBRJP200.DLL" is present in a directory "WINDIR" representing the storage location of the OS of the terminal 23 of the user A (at MQ1), the host computer 21 sends a message "RIS_CHECKENV*RESP" along with the command "ST4 @WINDIR@VBRJP200.DLL" to the terminal 23. At this point, with reference to user A's environment file 39, the host computer 21 substitutes "@WINDIR@" with "D:¥WINDOWS" and sends it to the terminal 23. In this example, "@WINDIR@" represents the content of a variable WINDIR embedded between the two @s. The file "VBRJP200.DLL" is one of the file necessary for operating "TETRIS".

The terminal 23 determines whether or not the file "VBRJP200.DLL" is stored in the directory "WINDOWS" of the drive D, and sends back the result as "ANS" to the host computer 21. In this example, since the file "VBRJP200.DLL" is not stored in the directory "WINDOWS", a message "ANS=OFF" is sent back to the host computer 21.

Since the file "VBRJP200.DLL" is not stored in the terminal 23, the host computer 21 sends a message "WOULD YOU LIKE TO COPY "VBRJP200.DLL"? (YES/NO)" to the terminal 23 corresponding to the check script 40 (at MQ2). This message is displayed on the screen of the display unit 24. The user A inputs his reply to the inquiry and the terminal 23 sends the reply of the user A to the host computer 21. In this example, the "ANS=YES" is sent back to the host computer 21. The host computer 21 permits a remote install corresponding to the check script 40 (RIS=OK) and turns on a flag F2 that causes the file "VBRJP200.DLL" to be copied (at MA2).

When the file "VBRJP200.DLL" is stored in the designated directory of the terminal 23, since "ANS=ON" is sent back, the state of "RIS=OK" takes place (at MA1).

Since the environment check is automatically performed, software programs that do not accord with the environment of the terminal of the user A can be prevented from being delivered from the host computer 21. For example, after a user purchases a software program through the communication line 22, the problem in which the program does not operate on the user's terminal due to the lack of a particular driver, for example, can be prevented.

When the state of "RIS=OK" takes place, the host computer 21 completes the environment check and sends the determined result "JUDGE=OK" along with the directory name of the destination represented by the variable "SOUKODIR" to the terminal 23. The "SOUKODIR" is designated in such a manner that "TET" that is the recommended directory name is added to "D:¥SOUKO", which is the directory of "SOUKO" stored in the user A's environment file.

At this point, flags representing the install (RIS) (YES/NO), the registration of the icon of the install program (installer) (ICON) (YES/NO), and the down-load (DLOAD) (YES/NO) are sent to the terminal 23. Corresponding to these flags RIS, ICON, and DLOAD, the host computer 21 sends the availability of the install, the registration of the icon of the installer, and the download to the terminal 23.

In this example, the install represents an operation in which a software program selected by the user A is registered to a system such as WINDOWS of the terminal 23, so that it can be operated on the terminal 23. Thus, in this case, the install includes an operation in which the execution file of the software program is registered as an icon in WINDOWS. On the other hand, the registration of the icon of the installer represents an operation in which a software program to be installed is registered as an icon on the terminal 23.

In this example, conditions of which the install and the download are permitted ("RIS=OK" and "DLOAD=OK") are provided. However, the registration of the icon of the installer is not registered "ICON=NG". When a software program selected has a complicated install program, a message "REGISTRATION OF ICON OF INSTALLER IS REQUIRED INSTEAD" is displayed instead of the permission for the install. When a terminal that uses WINDOWS requests the host computer for an application program for TOS (TOWNS' OS), only the download operation is permitted.

Next, the terminal software program of the terminal 23 designates the priority of the install, the registration of the icon of the installer, and the download, in order. The terminal software program designates the highest priority operation as a default operation and displays the default operation on the screen of the display unit 24. In this example, the terminal software program designates the install, that has a higher priority than the download, as the default operation. The default operation is displayed in an install method selecting window.

FIG. 5 is a schematic diagram showing an example of the install method selecting window. In FIG. 5, "REGISTER SYSTEM" corresponds to the install that is selected as a default operation.

The user A checks the install methods displayed on the screen and inputs a desired install method (at step S15). At this point, the user A can change the install methods displayed on the screen. For example, when the user A wants to register the icon of the installer, he selects "REGISTER ICON OF INSTALLER" in the install method selecting window shown in FIG. 5.

When the user A wants to quickly perform the install, he selects "REGISTER SYSTEM". When the user A wants to use a custom install, he selects "REGISTER ICON OF INSTALLER". When the user A wants to change the storage location of the selected program (install the selected software program to another terminal), he selects "DOWNLOAD". When the user A selects the "DOWNLOAD", he can test whether or not a software program corresponding to another terminal operates on the terminal 23.

Next, the terminal 23 automatically creates the subdirectory for the delivery "D:¥SOUKO¥TET" designated by the host computer 21 to the hard disk 25 (at step S16). When the terminal 23 has the subdirectory "D:¥SOUKO¥TET", it creates, for example, a subdirectory "D:¥SOUKO¥TET001". When the terminal 23 already has the subdirectory "D:¥SOUKO¥TET001", it creates a subdirectory "D:¥SOUKO¥TET002".

A main file 41 of "TETRIS" is composed of files "TET1.LZH" (F1) and "VBRJP200.DLL" (F2). The file "TET1.LZH" is composed by compressing four files "TETRIS.EXT", "TOWNS.DRV", "PC98.DRV", and "MAC.DRC". When the file "TET1.LZH" is decompressed, these four files "TETRIS.EXT", "TOWNS.DRV", "PC98.DRV", and "MAC.DRC" are generated. The file "TET1.LZH" is decompressed after it is delivered from the host computer 21 to the terminal 23.

The terminal 23 that has created the subdirectory for the delivery sends the selected software program number along with a command "RIS_INSTALL", that requests the remote install, to the host computer 21 (at step S17 in FIG. 4). The host computer 21 starts the remote install of the software program corresponding to the software program number to the terminal 23. The remote install is automatically performed between the host computer 21 and the terminal 23 corresponding to the install script 42 of "TETRIS" (at step S18).

The install script 42 contains a command for downloading the file "TET1.LZH" to a storage location "@SOUKODIR@" of the terminal of the user A. Thus, the host computer 21 substitutes "@SOUKODIR@" with "D:¥SOUKO¥TET", and downloads the file "TET1.LZH" to the directory "D:¥SOUKO¥TET" of the hard disk 25.

When the terminal 23 sends a message "DOWNLOAD COMPLETED (OK)" to the host computer 21, it substitutes "@WINDIR@" with "D:¥WINDOWS" and downloads the file "VBRJP200.DLL" to the directory "D:¥WINDOWS" of the hard disk 25.

When the terminal 23 sends a message "DOWNLOAD COMPLETED (OK)" to the host computer 21, it sends a command "LHA X D:¥SOUKO¥TET¥TET1.LZH" for causing the file "TET1.LZH" to be decompressed to the storage location "@SOUKODIR@". Thus, the terminal 23 decompresses the file "TET1.LZH" to the above-mentioned four files "TETRIS.EXE", "TOWNS.DRV", "PC98.DRV", and "MAC.DRC". These decompressed files are stored in the subdirectory "D:¥SOUKO¥TET" in which the file "TET1.LZH" has been stored.

When the terminal 23 sends a message "FILE DECOMPRESSED (OK)" to the host computer 21, it sends a message "MOVE D:¥SOUKO¥TET¥TOWNS.DRV D:¥WINDOWS¥FONT.DRV", for moving the file "MODEL@.DRV" from the storage location "@SOUKODIR@" (D:¥SOUKO¥TET) to the storage location @WINDIR@ (D:¥WINDOWS) and changing the file name to "FONT.DRV", to the terminal 23. At this point, with reference to the user A's environment file 39, the host computer 21 substitutes "MODEL@" with "TOWNS". Thus, the terminal 23 moves the file "TOWNS.DRV" from the directory "D:¥SOUKO¥TET" to the directory "D:¥WINDOWS" and changes the file name to "FONT.DRV".

When the terminal 23 sends a message "RENAME COMPLETED (OK)" to the host computer 21, the host computer 21 sends a command "ICON TETRIS.EXE" for registering the icon of "TETRIS's" execution file "TETRIS.EXT" to the terminal 23. Thus, the terminal 23 registers the file "TETRIS.EXE" in the subdirectory "D:¥SOUKO¥TET" as an icon of the terminal 23. Consequently, the icon 37 for starting the file "TETRIS.EXE" is displayed in the directory window 36 on the screen of the display unit 24. By selecting the icon 37, the program "TETRIS" gets started.

When the terminal 23 sends a message "ICON REGISTERED (OK)" to the host computer 21, the host computer 21 returns a message representing that the remote install has been completed, to the terminal 23. Thus, the install is completed. When the terminal 23 receives the message "REMOTE INSTALL COMPLETED" from the host computer 21, the user A of the terminal 23 selects a next software program if required, and the terminal 23 performs the remote install thereof. Alternatively, the process is completed (at step S19).

When a software program is installed at step S18, if the storage capacity of the software program is larger than the blank space of the storage location to which the software program is to be downloaded, the storage location is changed.

Next, with reference to FIGS. 6 to 11, examples of protocols of a remote install and examples of a first keyword and a second keyword displayed on the screen of the display unit will be described.

FIG. 6 is a program code list showing an example of a protocol with which the terminal 23 sends environment information, in the case that the terminal 23 accesses the host computer 21 at step S3 shown in FIG. 2. The protocol shown in FIG. 6 contains a request ID "RID", a machine ID "MID" for identifying a machine, date and time "TIME", and machine information for the terminal 23 "MACHINE:".

In "MACHINE:", drive information "DRV:" contains information such as storage capacities and drive names of drives such as the hard disk 25 connected to the terminal 23. For example, in "PARTINF:", "CAPACITY" represents the storage capacity of a partition. "VACANT" represents the storage capacity of a blank region. "DRVNAME" represents the drive name of a partition.

"DRV:" is followed by a directory "SOUKODIR" in which delivered software programs are stored, and by a directory "WINDIR" in which the OS (WINDOWS) is stored. In this example, "SOUKODIR=D:¥RIS¥SOUKO" and "WINDIR=D:¥WINDOWS" are written. Thereafter, information about memories "MEM:" is written. With "SOUKODIR", the terminal 23 notifies the host computer 21 of the storage location of software programs to be delivered.

"MACHINE:" is followed by a machine password "MPSWD" of the terminal 23 and so forth.

FIG. 7 is a program code list showing a protocol with which the host computer 21 sends a directory "SOUKODIR" and a subdirectory to the terminal 23 upon completion of the environment check at step S14 shown in FIG. 3. In the protocol shown in FIG. 7, a request ID "RID" and a determined result of an environment check "JUDGE" are written. Thereafter, information about the storage location of software programs to be delivered "STRPLACE:" is written.

In "STRPLACE:", "SOFT" represents a software program number selected by the user at step S12 shown in FIG. 3. "WORKDIR" represents a working area. "SOUKODIR" represents the storage location of a software program designated by the host computer 21. In this example, "WORKDIR" is the same as "SOUKODIR" shown in FIG. 6. "SOUKODIR" is composed of "SOUKODIR" shown in FIG. 6 and a subdirectory name "FM".

"STRPLACE:" is followed by the size of the working area, "WORKSIZE", and the size of the storage location of a software program to be delivered, "SOUKOSIZE".

FIG. 8 is a program code list of a protocol with which the host computer 21 sends a first key list and a second key list to the terminal 23, and then the terminal 23 sends back a key number of a keyword selected by the user A to the host computer 21 at steps S4 to S9 shown in FIGS. 2 and 3. In the protocol shown in FIG. 8, when the terminal 23 requests the host computer 21 for a first key list with a command "RIS__KEYLIST", the host computer 21 sends back a message "RIS__KEYLIST*RESP" along with the content of the first key table "KEYLIST:" to the terminal 23. In "KEYLIST:", keywords NAME="OS", "PROGRAMMING LANGUAGES", "GAMES", and so forth corresponding to key number KEY=1, 2, 3, and so forth are written.

Next, the terminal 23 sends a command "RIS__KEYLIST" along with the key number 3 corresponding to the first keyword "GAMES" selected by the user A to the host computer 21, it sends back a message "RIS__

KEYLIST*RESP" along with the content of the second key table, "KEYLIST:", corresponding to the key number 3. In "KEYLIST:", keyword NAME="RPGS", "ACTIONS", "PUZZLE/QUIZ", "SIMULATION", "JOKE", and so forth corresponding to key numbers=51, 52, 53, 54, 55, and so forth are written.

The terminal 23 sends a command "RIS_LIST" along with the key numbers 52 and 53 corresponding to the second keywords "ACTIONS" and "PUZZLE/QUIZ" selected by the user A to the host computer 21, so as to request it for a list of software programs corresponding to the three key numbers 3, 52, and 53. In this example, since the host computer 21 has stored the key number 3 of the first keyword, the terminal 23 sends only the key numbers 52 and 53 of the second keywords along with the command "RIS_LIST".

FIG. 9 is a schematic diagram showing an example of first keywords and second keywords displayed on the screen of the display unit 24. The first and second keywords shown in FIG. 9 differ from those shown in FIG. 8. On the screen of the display unit 24 of the user A, for example, first keywords such as "PICTURES" and "GAMES" are displayed. When the user A selects a first keyword, second keywords, such as "TOOLS", "TEXTS", "DOS", "WIN", "PICTURES", "SOUND", and "GAMES" are displayed. The second keywords include categories such as "PICTURES" and "GAMES" that overlap with those of the first keywords.

The user A can select any keyword on the screen of the display unit 24. For example, the user A selects "PICTURES" as a first keyword and "TOOLS", "DOS", "GAMES", or the like as a second keyword. As another example, the user A selects "GAMES" as a first keyword and "DOS", "WIN", "PICTURES", "SOUND", or the like as a second keyword. Alternatively, the user A may select two or more second keywords at one time.

Generally, there are many keywords for selecting a desired software program from the software program group 35. Thus, when all software programs of the software program group 35 are displayed at the same time, they are displayed in disorder. To prevent this problem, keywords may be displayed with a menu in a tree structure. However, in this case, the first keyword that is selected is important. When the first keyword is incorrectly selected, a desired software program cannot be obtained.

To solve this problem, when keywords are displayed with two hierarchical levels in such a manner that they overlap in each hierarchial level, as shown in FIG. 9, the user can flexibly select a desired one from a large number of keywords. It should be noted that the number of hierarchical levels is not limited to two. Instead, keywords may be categorized in many hierarchical levels.

Each software program included in the software program group 35 is stored in such a manner that it correlates with several keywords. For example, a software program A may have three keywords "GAMES", "PICTURES", and "DOS". A software program B may have four keywords "PICTURES", "TOOLS", "WIN", and "GAMES". Thus, when the user A selects two keywords "PICTURES" and "GAMES", the host computer 21 sends a list of software programs that include these two software programs to the terminal 23, and the display unit of the terminal 23 displays the list on the screen.

FIG. 10 is a program code list showing another example of a protocol with which the terminal 23 sends environment information to the host computer 21 in the case that the terminal 23 accesses the host computer 21 at step S3 shown in FIG. 2. In the protocol shown in FIG. 10, "MODEL" in machine information "MACHINE:" represents information obtained when the terminal software program is installed at step S1 shown in FIG. 2. In this example, "MODEL" represents TOWNS that is the model of the terminal 23. "VACANT" in "PARTINF:" is information obtained before the terminal 23 accesses the host computer 21 at step S3 shown in FIG. 2. In this example, "VACANT" represents the storage capacity of the blank space of the related partition.

FIG. 11 is a program code list showing an example of a protocol for performing the environment check at step S14 and for starting the install at step S17. In the protocol shown in FIG. 11, the terminal 23 sends a command "RIS_CHKENV" along with a software program number (software program code) "SOFT=5" selected by the user A to the host computer 21, so as to request the host computer 21 to perform the environment check.

The host computer 21 sends a message "RIS_CHKENV*RESP" along with a command "CHKEXE:" for searching whether or not a file "VBRJP200.LDD" is present in the system directory of the terminal 23, to the terminal 23. "CHKEXE:" contains TAG="VBRJP200.DLL", CMD= "ST4 D:¥WIND0WS¥SYSTEM¥VBRJP200.DLL", WORKDIR="D:¥RIS¥KOBUTA" (for designating the working directory), SOUKODIR="D:¥RIS¥KOBUTA" (for designating the storage location for a software program to be delivered), and so forth.

The terminal 23 determines whether or not the file "VBRJP200.DLL" is present in the directory "WINDOWS¥SYSTEM" of the drive D, and sends back the result "RESULT:" to the host computer 21. "RESULT:" contains TAG="VBRJP200.DLL" and VAL="OFF" (that is the determined result). This means that the file "VBRJP200.DLL" is not present in the system directory.

The host computer 21 sends a message "RIS_CHKENV*RESP" along with a command "ASKCHK:" for inquiring of the user whether to install the selected software program to the terminal 23. "ASKCHK:" contains TAG= "Q1", QUERY="TO EXECUTE THIS SOFTWARE PROGRAM . . . WOULD YOU LIKE TO INSTALL THE PROGRAM SOFTWARE?" (that is the inquiry to be displayed), and "ANS:" (that is the format of the reply).

The terminal 23 sends back a command "RIS_CHKENV" along with a reply "RESULT:" that is input by the user A to the host computer 21. "RESULT:" contains TAG="Q1" and VAL="OK" (that is the result of the reply). This means that the software program can be installed.

Assuming no other problem on the operating environment, the host computer 21 sends a message "RIS_CHKENV*RESP" along with an environment check result JUDGE="OK" to the terminal 23. The environment check result represents that the operating environment of the software program of the software program code number 5 accords with the operating environment of the terminal 23 and the software program can be installed to the terminal 23, except that the file "VBRJP200.DLL" is not present in the system directory of the terminal 23.

Since the environment check result is "OK", the terminal 23 sends a command "RIS_INSTALL", along with TYPE= "RIS" (that represents the type of the install method), "STRPLACE:" (that designates the storage location of the software program to be delivered), and so forth to the host computer 21, so that the host computer 21 installs the software program to the terminal 23. "STRPLACE:" contains "SOFT" (that is a software program code of the software program to be installed), "WORKDIR" (that is a working directory), and "SOUKODIR" (that is the directory of the storage location of the software program to be delivered).

Thereafter, the host computer 21 installs the selected software program using the designated method. When the software program is installed, as described in step S18 in FIG. 4, the terminal 23 decompresses the file corresponding to a command sent from the host computer 21, and copies the decompressed files to the system. Since the terminal 23 successively sends back responses to the host computer 21, it can completely monitor the progress of the install operation.

However, in this method, since the terminal 23 should frequently communicate with the host computer 21, the communication efficiency is reduced. To solve this problem, the host computer 21 may prepare a setup file that contains commands for the install operation and sends the file to the terminal 23, so that it automatically installs the selected software program.

FIG. 12 is an operating flow chart showing an automatic install in the case that a setup file is used. The install operation shown in FIG. 12 is performed after the subdirectory is created at step S16 shown in FIG. 3.

The terminal 23 sends a command "RIS_INSTALL" along with a software program number to the host computer 21 (at step S21). The host computer 21 starts the remote install of the software program corresponding to the software program number sended. The remote install operation is automatically performed between the host computer 21 and the terminal 23 corresponding to the install script 43 created by the host computer 21 (at step S22).

The host computer 21 substitutes "@SOUKODIR@" with "SOUKODIR=D:¥SOUKO¥TET" and downloads a file "TET1.LZH" to a subdirectory "D:¥SOUKO¥TET" of the hard disk 25.

When the host computer 21 receives a message "OK" that represents that the file has been downloaded from the terminal 23, the host computer 21 substitutes "@WINDOW@" with "D:¥WINDOWS" and downloads a file "VBRJP200.DLL" to a directory "D:¥WINDOWS" of the hard disk 25.

When the host computer receives a message "OK" that represents that the file "VBRJP200.DLL" has been downloaded from the terminal 23, the host computer 21 substitutes "@SOUKO@" with "SOUKO=D:@SOUKO", and downloads a user A's setup file 44 "SETUP.INF" that contains commands executed by the terminal 23, to a directory "D:¥SOUKO" of the hard disk 25. At this point, with reference to a user A's environment file 39, the host computer 21 rewrites information such as "MODEL", "SOUKO", and "WINDIR" contained in the setup file "SETUP.INF" with information for the user A, and sends the resultant information to the terminal 23. The setup file "SETUP.INF" contains commands for decompressing the file "TET1.LZH", moving the file "TOWNS.DRV", renaming it, and registering the file "TETRIS.EXE" in the system.

When the terminal 23 sends a message "OK" that represents that the file has been downloaded to the host computer 21, it sends a command "INSTALL D:¥SOUKO¥SETUP.INF" for performing the automatic install corresponding to the commands contained in the setup file "SETUP.INF" to the terminal 23.

The terminal 23 performs the automatic install corresponding to the commands contained in the setup file "SETUP.INF". With a command "LOG OFF", the terminal 23 disconnects the communication line 22 between the terminal 23 and the host computer 21. Thereafter, since the communication line 22 is not used, a communication fee is not charged. Next, with a command "LHA X D:¥SOUKO¥TET¥TET1.LZH", the terminal 23 decompresses the file "TET1.LZH" into the above-mentioned four files "TETRIS.EXE", "TOWNS.DRV", "PC98.DRV", and "MAC.DRC".

Thereafter, with a command "MOVE D:¥SOUKO¥TET¥TOWNS.DRV D:¥WINDOWS¥FONT.DRV", the terminal 23 moves the file "TOWNS.DRV" from the directory "D:¥SOUKO¥TET" to "D:¥WINDOWS" and changes the file name from "TOWNS.DRV" to "FONT.DRV". Next, with a command "ICON TETRIS.EXE", the terminal 23 registers an icon of the file "TETRIS.EXE". With a command "POFF", the terminal 23 turns off the power thereby terminating the install operation.

When the automatic install is performed with the setup file, the host computer 21 cannot finally check whether or not the install operation has been completed. However, since the number of communication sessions is reduced, the use efficiency of the communication line 22 can be improved. In addition, before the user purchases a software program, install conditions such as the model of the terminal are checked and the install is automatically performed.

FIG. 13 is a program code list showing another example of the setup file. In the setup file shown in FIG. 13, [DstDirs] represents a list of storage locations of files. [Files] represents a list of files to be stored. In this example, the setup file contains commands for storing an execution file "Soft2.Exe" of a software program selected by the user in a directory "D:¥RIS¥KOBUTA", renaming the file "TOWNS.DRV" that is a driver for TOWNS to "FONT.DRV", and storing the file "FONT.DRV" in the directory "D:¥WINDOWS¥SYSTEM".

When the setup file is generated, the content of [DstDirs] is "1=SOUKODIR, 2=WINDIR". When the host computer 21 obtains information of "SOUKODIR" and "WINDIR", the content of [DstDirs] is rewritten to "1=D:¥RIS¥KOBUTA, 2=D:¥WINDOWS¥SYSTEM". Thus, the content of the setup file can be dynamically or selectively changed.

As described above, according to the related art reference, a software program desired by a user can be automatically installed from a delivery center to a user's terminal through a communication line. With this system, software programs can be sold to users through the communication line.

At this point, since a delivered software program is stored in a dedicated directory, it is well-maintained and the user does not need to input a character string to designate a directory in which the delivered software program is stored.

The user can effectively select a desired software program on the screen of the display unit. In addition, the user can select the install method of the software program. Moreover, the user does not need to check the operating environment of the software. Instead, the operating environment is automatically checked.

Furthermore, when a software program is installed, the use of the communication line can be minimized.

However, the above-described remote install system has the following problem.

The host computer of the delivery center can automatically install software programs to terminals of users. On the other hand, the system does not have a portion that automatically registers a software program created by a user to the host computer. Thus, to register a software program to the host computer, an operator of the delivery center should upload desired files from a user's terminal to the host computer.

In addition, software programs registered in the delivery center are inflexibly managed. These software programs are delivered only through the delivery center. However, although the range of software programs users desire is wide, they must all access the system through the same delivery center. To effectively select a software program from the huge collection of software programs in the delivery center, the user should input, for example, a plurality of keywords.

SUMMARY OF THE INVENTION

An object of the present invention is to provide a software registering/managing system for automatically registering a software program from a terminal of a user to a host computer and for flexibly managing the registered program and a method thereof.

A software registering/managing system according to the present invention is disposed in an information processing system that delivers a software program to a terminal of a user through a communication network. The software registering/managing system has a managing portion, a storing portion, and an installing portion.

[a] The managing portion provides at least one club for the terminal of the user. A club has a conference room function that is a virtual place for managing registered software programs and for electrically exchanging information between users. The user uploads and register software information to a selected club.

[b] The clubs are, for example, hierarchically structured. The managing portion permits the user to upload software information to a club in the lowest hierarchical level. The uploaded software information can be accessed from clubs in higher hierarchical levels than the club to which the software information is uploaded. Alternatively or in addition, the managing portion manages the club to which the software information is uploaded as an original club. By linking the software information from the original club to another club, or moving the authority of the original club to another club, the software information can be seen from other than the original club.

[c] The storing portion stores software information uploaded to the clubs. The software information is divided into, for example, fundamental information necessary for registering information to a database, descriptive information containing a summary of the software program, and main information in which the main portion of the software program is compressed. The storing portion receives the software information in a standardized format from the users. The managing portion adds a software program identifier (that identifies software information), an upload user identifier (that identifies a user who uploads the software information), and an original club identifier (that identifies a club to which the software information is registered). The resultant software information is stored in the storing portion. In addition to the above-mentioned identifiers, at least one of a linked club identifier (that identifies a linked club of the software information), a keyword (used in the club for searching for a software program), and the last access date/time at which the software information was accessed most recently, are added to the software information. Among these identifiers, when the software program identifier is categorized as software information that has not been published and software information that has been published, they can be distinguished.

[d] The installing portion automatically installs a software program to a storage region of a terminal of a user corresponding to the software information stored in the storage region. The managing portion receives a delivery request from a user through a club. The installing portion installs a software program through a club corresponding to the delivery request.

According to the software registering/managing system according to the present invention, since a software program received from a user is registered through a club and a delivery request of a software program is issued through a club, a user who wants to install a software program searches for a software program with a search keyword used in the club, and issues a delivery request for the software program. Thus, the searching time can be reduced.

In addition, software programs that have been installed are supported for each club. Thus, when a user selects a club that securely supports software programs, he can securely install a desired software program because it is well-supported by the club.

Moreover, since software information used to register a software program is standardized, the software program can be automatically registered and it can be easily checked. Thus, the load on the system supervisor can be decreased.

Furthermore, since software information that has not been published and software information that has been published are categorized, a software program can be delivered as a test delivery to an upload user and a club supervisor.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 6 is a program code list showing a protocol for a remote install (No. 1);

FIG. 7 is a program code list showing the protocol for the remotely install (No. 2);

FIG. 8 is a program code list showing a protocol for selecting a keyword;

FIG. 10 is a program code list showing a protocol for sending environment information;

FIG. 11 is a program code list showing a protocol for performing an environment check;

FIG. 13 is a program code list showing an example of a setup file;

FIG. 14 is a block diagram showing the theory of the present invention;

FIG. 15 is a block diagram showing a structure of the system according to the present invention;

FIG. 18 is a program code list showing a commodity database;

FIG. 19 is a table showing authority of use of commands;

FIG. 24 is a program code list showing a CFG file (No. 1);

FIG. 25 is a program code list showing the CFG file (No. 2);

FIG. 26 is a program code list showing the CFG file (No. 3);

FIG. 27 is a program code list showing the CFG file (No. 4);

FIG. 28 is a diagram showing the content of a descriptive file;

FIG. 29 is a program code list showing a main file;

FIG. 30 is a program code list showing a check script for performing an environment check contained in a CHK file;

FIG. 31 is a program code list showing the content of an ICON file;

DESCRIPTION OF PREFERRED EMBODIMENTS

Figure 1:
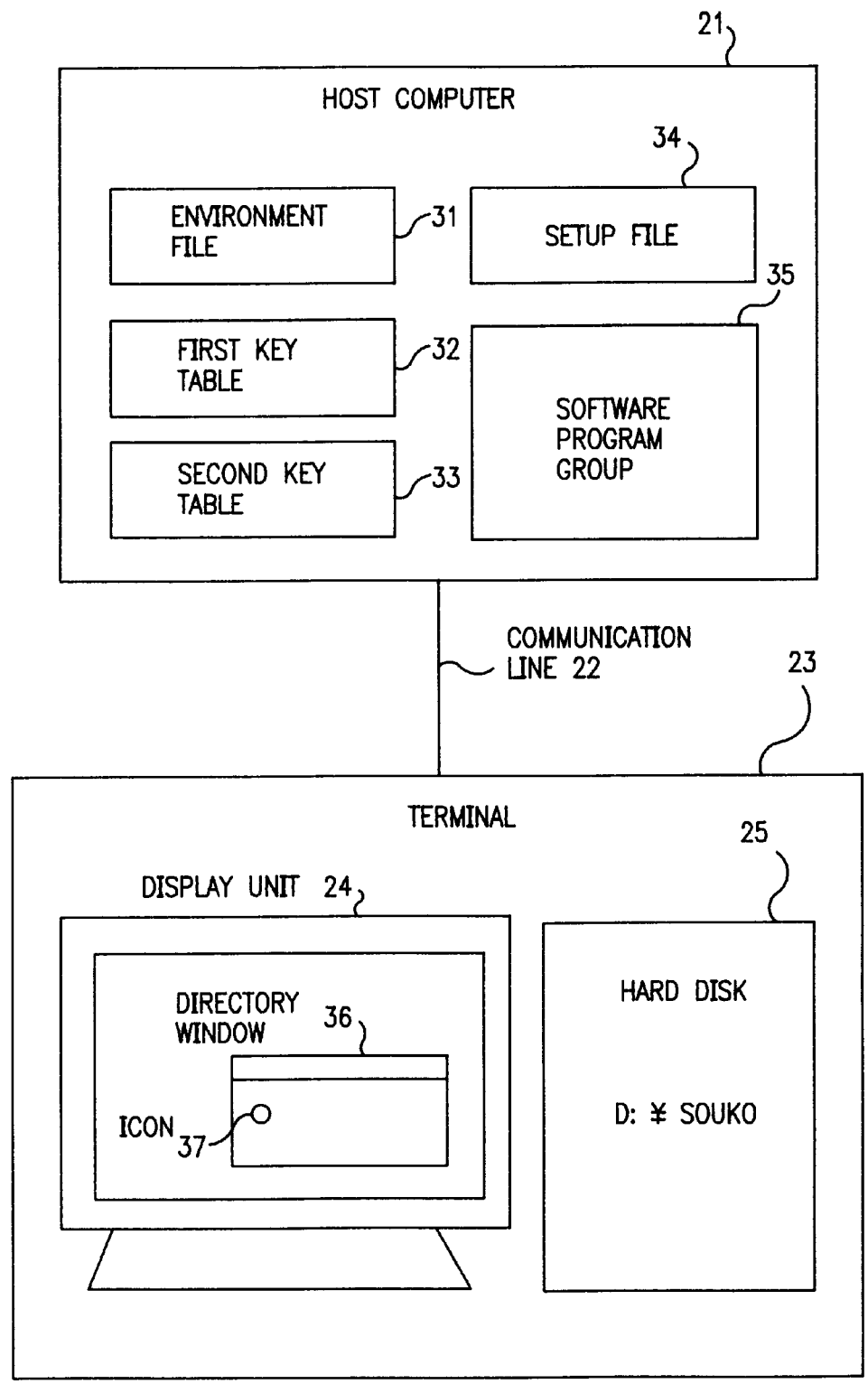
FIG. 1 is a block diagram showing a structure of a remote install system according to a related art reference.
Figure 2:
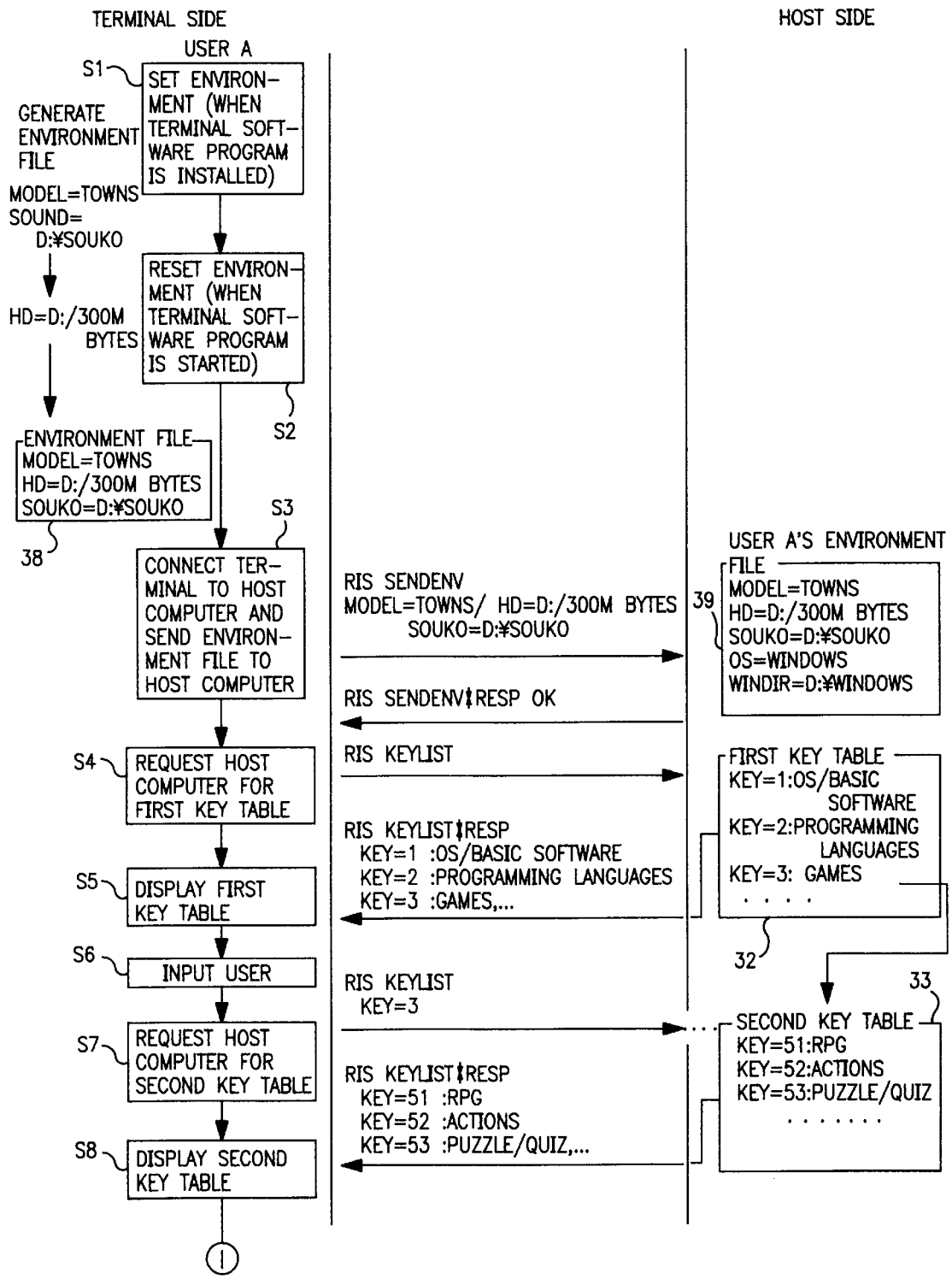
FIG. 2 is an operating flow chart showing a process for performing a remote install (No. 1)

Next, with reference to the accompanying drawings, embodiments of the present invention will be described in detail.

FIG. 14 is a block diagram showing the theory of a software registering/managing system according to the present invention. The software registering/managing system shown in FIG. 14 comprises a managing portion 51, a storing portion 52, and an installing portion 53.

The managing portion 51 provides at least one club for the terminal. Each club has a conference room function that is a virtual place for managing registered software programs and for electrically exchanging information between users.

The storing portion 52 stores software information uploaded to each club.

The installing portion 53 automatically installs a software program to a storage region of the terminal corresponding to the software information stored in the storing portion 52.

Each club that the managing portion 51 provides is a place for exchanging information about particular themes between users. When a user accesses a particular club, a menu of functions such as conference rooms and remote install is displayed on the screen of the display unit of the terminal of the user. With a conference room function, a user of the club can obtain information about software from another user or the supervisor of the club.

In addition, each user can upload and register software information he has created to a particular club corresponding to the obtained information. The user can freely select a club to which he will upload the created software information. The managing portion 51 can link software information from one particular club to another club.

The managing portion 51 automatically stores software information uploaded by a user to the storing portion 52. The installing portion 53 delivers software information to a proper directory of a terminal of a requester corresponding to a request issued by an upload user or another user. At this point, a user can issue a delivery request to any club that has his desired software information.

In addition, the managing portion 51 receives software information from a terminal and manages it. The software information received from a terminal has been standardized. Each software information is composed of fundamental information necessary for a database registering process, descriptive information containing a summary of the software program, and main information in which the main portion of the software program is compressed.

The storing portion 52 stores such software information.

Since the format of the software information uploaded from each terminal has been standardized, the software information can be automatically registered to the database. In addition, a virus check and so forth for information being uploaded can be automatically performed. Moreover, since the software information is separately managed as fundamental information, descriptive information, and main information, each of these can be checked as necessary. Even if an error takes place, only an improper portion of information needs to be corrected and then uploaded again. Thus, software programs are automatically and effectively registered.

For example, the managing portion 51 and the installing portion 53 shown in FIG. 14 correspond to a CPU (central processing unit) of a host computer 63 shown in FIG. 15. The storing portion 52 corresponds to a memory or a disk unit of the host computer 63.

FIG. 15 is a block diagram showing a structure of a software registering/managing system. In the software registering/managing system shown in FIG. 15, N terminals 61-1, ..., 61-N are connected to a host computer 63 through a communication network 62. The terminals 61-1, ..., 61-N are terminals of users of the software registering/managing system. The host computer 63 is disposed on the delivery center side. On the network 62, one host computer 63 is disposed. However, a plurality of host computers may be distributed on the network.

Next, the structure of locations in which information is exchanged in the software registering/managing system shown in FIG. 15, the authority of members of the system, the structure of information, modes of services, and so forth, will be described.

Figure 16:
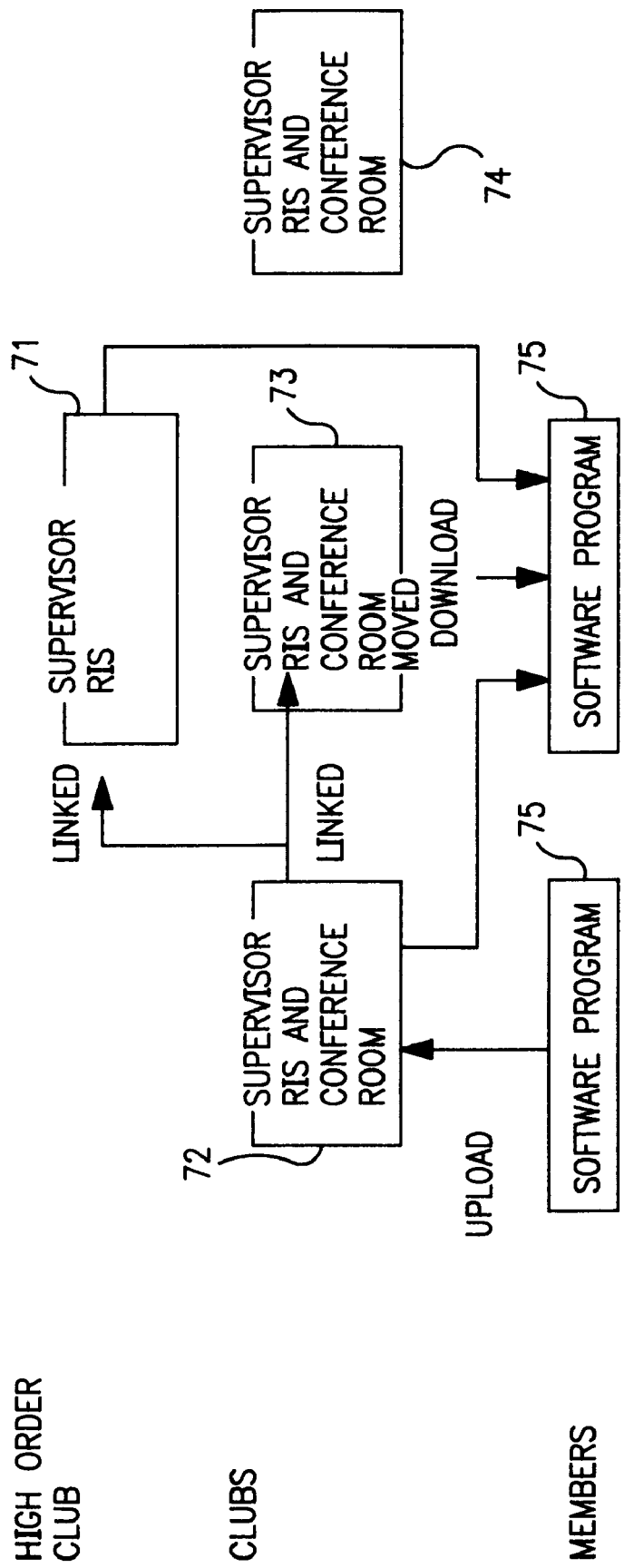
FIG. 16 is a schematic diagram showing a hierarchical structure of clubs.

FIG. 16 is a block diagram showing a structure of locations formed in the software registering/managing system. In this embodiment, user groups referred to as clubs form virtual places for exchanging software information. Users associated with each club are referred to as members, too. In FIG. 16, clubs 72, 73, and 74 are included in the same hierarchical level. Each of the clubs 72, 73, and 74 has the conference room function and the remote install system (RIS) according to the related art reference.

A high order club 71 is disposed in a higher hierarchical level than the clubs 72, 73, and 74. In this example, the number of hierarchical levels is two. However, it should be noted that the number of hierarchical levels is not limited to two. Generally, a software program delivered to a user is uploaded and registered to any club. For example, when a software program 75 is uploaded to the club 72, the software program 75 is first registered to the club 72. Thus, the club 72 becomes the original club. To transfer the software program registered in the original club to another club, there are two methods, namely a linking method and a moving method.

When the linking method is used, the software program can be seen from other than the original club. On the other hand, when the moving method is used, the function of the original club is moved to another club. A member who wants the software program 75 can download it from one of the original club 72 and the linked clubs 71 and 73.

Normally, the member who created the software program 75 has the right to select an original club. However, after the member has uploaded the software program 75 and has given permission to publish it, the right for linking the software program or moving the authority of the original club to another club is transferred to the supervisor of the original club. In the practical management of the system, this right should be arranged between a member who uploads a software program and the supervisor of an original club. In the computer system, the duties and rights of the creator of a software program and individual supervisors may be set forth in a contract as follows.

(1) Rights and duties of a creator of a software program
  Right for uploading the software program
  Right for delivering a software program he has created as a test delivery without a fee (namely, the fee for an RIS for testing is free)
  Right to permit publishing of a software program he has created
  Duties for supporting a software program that he has uploaded (for example, he should answer questions from the users of the software program, and correct any errors in the software program)
(2) Rights and duties of the supervisor of the original club
  Right for testing software programs uploaded to the club without a fee (the fee for using software programs for testing is free)
  Right of publishing software programs uploaded to the original club
  Right for permitting a linked club to link a software program to other clubs
  Duty for supporting software programs in the original club
  Duty for permitting high order clubs to link software programs to other clubs, unless a justifiable reason exists
(3) Rights and duties of the supervisor of a linked club
  Right of publishing software programs that are permitted to be linked
  Duty for supporting software programs in the club
(4) Rights of the supervisor of a high order club
  Right of publishing software programs that are permitted to be linked Since high order clubs can normally link software programs of low order clubs to other clubs, members of the highest order club can see all software programs in the system. In addition, under the condition that the supervisor of the linked club securely supports the usage of a software program and so forth, the software program is linked to another club. Thus, in clubs of which the members can see a software program, the members can receive support for the software program surely.

Figure 17:
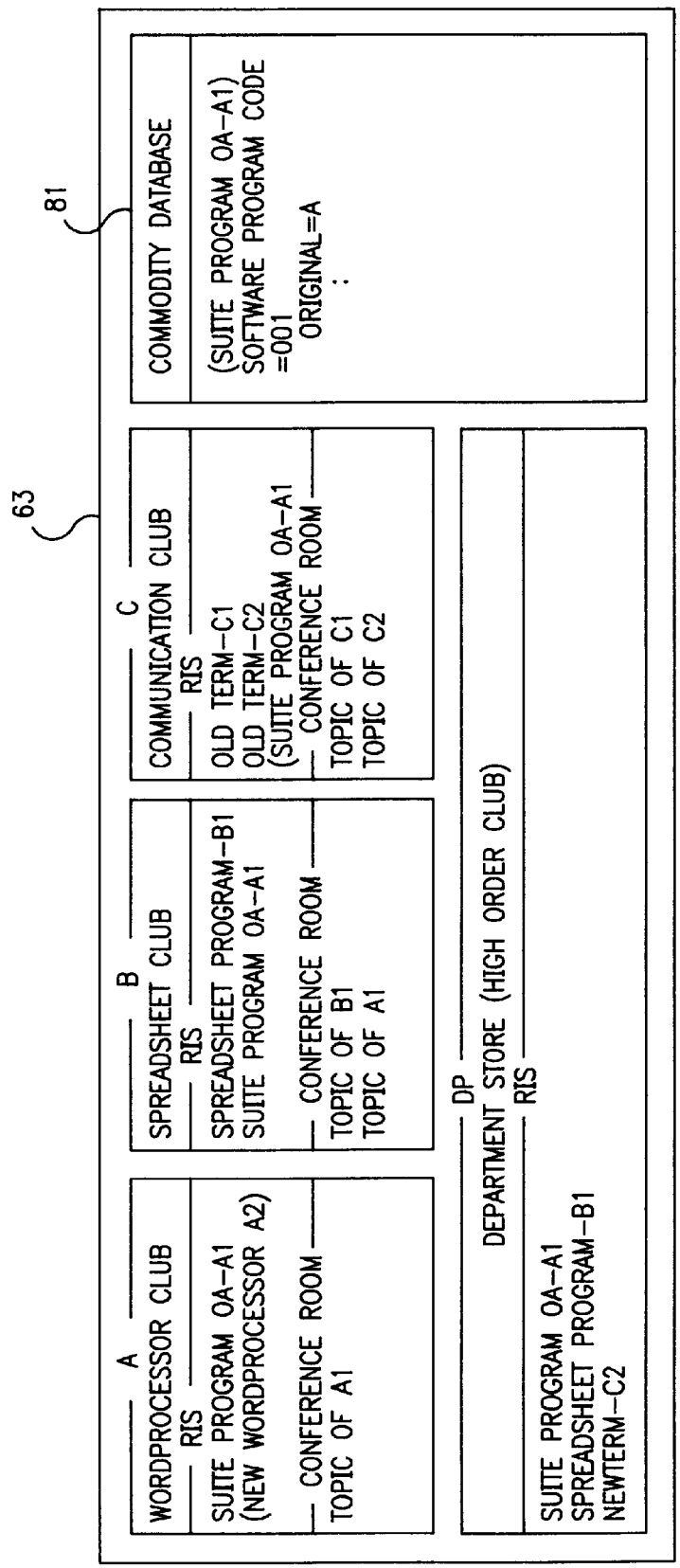
FIG. 17 is a schematic diagram showing clubs on a host computer.

FIG. 17 is a schematic diagram showing an example of clubs established on the host computer 63 with information exchanged through the network 62. When a particular terminal accesses the host computer 63, the user of the terminal can see clubs A, B, and C and a department store DP. The clubs A, B, and C correspond to software shops. The department store DP sells a variety of software programs.

A suite program OA-A1 has been registered in the RIS of a wordprocessor club A. A spreadsheet program B1 and a suite program OA-A1 have been registered in the RIS of a spreadsheet club B. Software programs OLDTERM-C1 and NEWTERM-C2 have been registered in the RIS of a communication club C. The department store DP corresponds to a high order club of the clubs A, B, and C. In this example, the suite program OA-A1, the spreadsheet program B1, and the program NEWTERM-C2, have also been registered in the department store DP. A commodity database 81 has stored management information of software programs in the system.

In FIG. 17, software programs parenthesized "( )" have not been completed by the supervisor. These software programs are invisible to the standard members of the system. For software programs that the standard members can see, they can have conferences in any club in the system so as to exchange information.

The department store DP may not be disposed as a high order club of the clubs A, B, and C. Instead, the department store DP may have a commodity supplying function.

The host computer 63 provides a content database such as the commodity database 81 so as to manage software programs registered in the system. The content database stores the following information.
  Software program ID: An identifier for identifying a software program in the system
  Upload user ID: An identifier for identifying a user who uses the system
  Original club ID: An identifier for identifying a club that has registered a software program in the system
  Linked club ID: An identifier for identifying a club to which a software program is linked in the system
  Keyword: A keyword used by each club
  Last access date/time: The date and time at which an uploaded software program was rewritten or read most recently FIG. 18 is a program code list showing an example of the commodity database 81. In the commodity database 81 shown in FIG. 18, "SOFTWARE PROGRAM CODE=001"

and so forth represent software program IDs. "UPLOAD= UID001" and so forth represent upload user IDs. "ORIGINAL=A" and so forth represent original club IDs. "LINKED CLUB ID 1=B" and so forth represent linked club IDs. In the example shown in FIG. 18, the registered suite program OA-A1 has been linked to other clubs B, C, and DP. However, the program OLDTERM-C1 has not been linked to these clubs. The new wordprocessor program A2 is a software program that has been uploaded and temporarily registered. "LAST ACCESS=1995/09/20/10:15:25" represents the last access date/time to the new wordprocessor program A2.

For defining the authority of a creator of a software program and supervisors of clubs, for example, the following management command group is required. The command group may be divided and realized with character base, command base, GUI (graphical user interface) base, and so forth. Any method can be used.

UPLOAD: Uploads a software program to the system.

RIS: Remotely installs a software program.

PUSH: Permits publishing of a software program or cancelling it.

PUBLISH: Publishes a software program or cancels it.

PERMISSION: Permits linking a software program to another club or cancels it.

LINK: Links a software program to another club and reallocates a keyword.

MOVE: Moves the authority of an original club to another club.

Among these commands, PUSH, PUBLISH, and PERMISSION perform their cancel operations with suitable switch options.

FIG. 19 is a table showing the authority of use of commands of a creator of a software program and supervisors. In this example, it is assumed that a software program is uploaded to an original club. In FIG. 19, "0" represents a command that an upload user whose created the software or a supervisor of the original club can use.

Among the above-described commands, only the supervisor of the original club can use the commands PERMISSION and MOVE. When the original club permits linking of a software program with the command PERMISSION, supervisors of a linked club and a high order club can link the software program to another club with the command LINK. With the command LINK, the linked club or the high order club can see the software file. With the command MOVE, the authority of the original club is moved to another club. Thus, the link of the former original club to the software program is disconnected.

Next, with reference to FIGS. 20 to 22, the operations of a creator of a software program and supervisors will be described.

Figure 20:
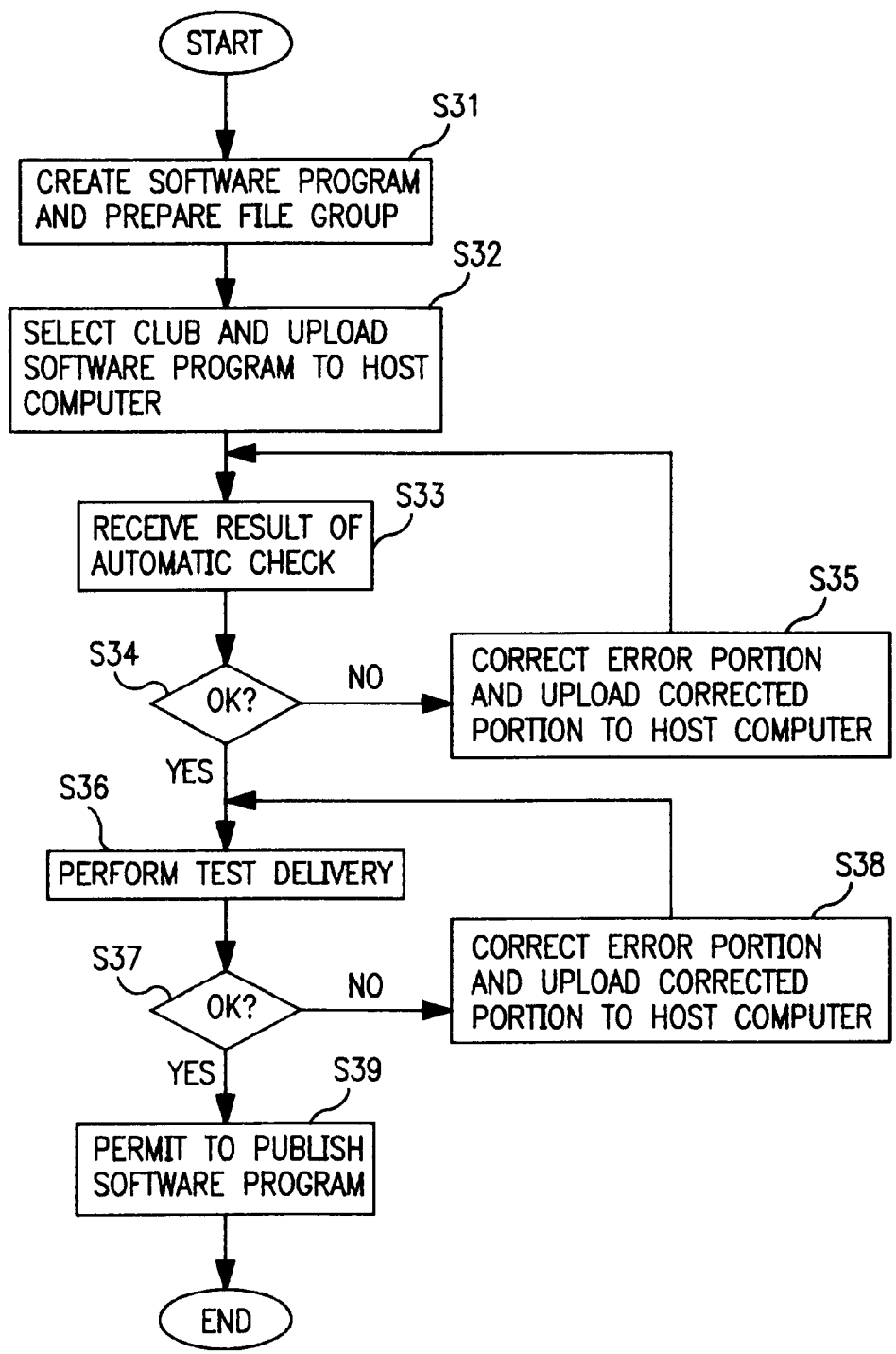
FIG. 20 is an operating flow chart showing operations performed by a creator of a software program.

FIG. 20 is an operating flow chart showing the operation of the program creator. In FIG. 20, when the operation is started, a creator creates a software program and prepares a file group to be uploaded (at step S31). Thereafter, the creator selects a club to which he wants to upload the created program. With the UPLOAD command, the program creator uploads the software program (at step S32) and receives the result of an automatic check performed by the host computer (at step S33). At this point, the host computer automatically performs a malfunction check, a virus check, a copyright check, a trademark check, and so forth. When an error is detected as a result of these check processes (at step S34), the creator corrects the error portion and uploads only the corrected portion (at step S35). Thereafter, the creator repeats the operation from step S33.

After the automatic check has been successfully completed, with the RIS command, the creator performs a test delivery (at step S36). In the test delivery, it is determined whether or not the uploaded software program can be remotely installed without a problem (at step S37). When an error takes place in the test delivery, the creator corrects the error portion and uploads the corrected portion again (at step S38). Thereafter, the creator repeats the operation after step S36. When the test delivery is successfully performed, with the PUSH command, the creator permits publishing of the software program (at step S39). Thus, the creator finishes the operation.

Figure 21:
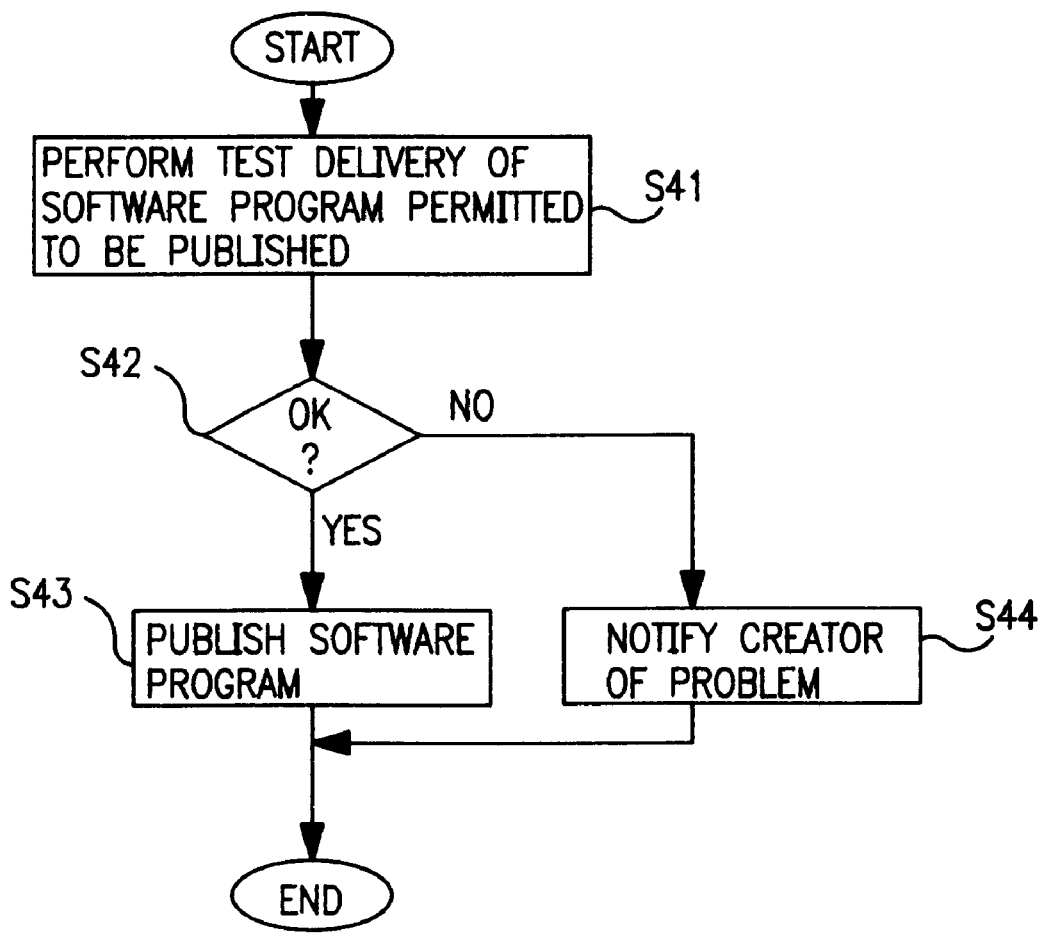
FIG. 21 is an operating flow chart showing operations of a supervisor of an original club.

FIG. 21 is an operating flow chart showing the operation of a supervisor of an original club. In FIG. 21, when the operation is started, the supervisor performs a test delivery of a software program permitted to be published by the creator thereof (at step S41) and checks whether or not the software program is normal (at step S42). When the test delivery is successfully completed, with the command PUBLISH, the supervisor publishes the software program to members of the original club (at step S43). When the software program has a problem such as a bug, the supervisor notifies the creator of the problem (at step S44). Thus, the supervisor finishes the operation.

Figure 22:
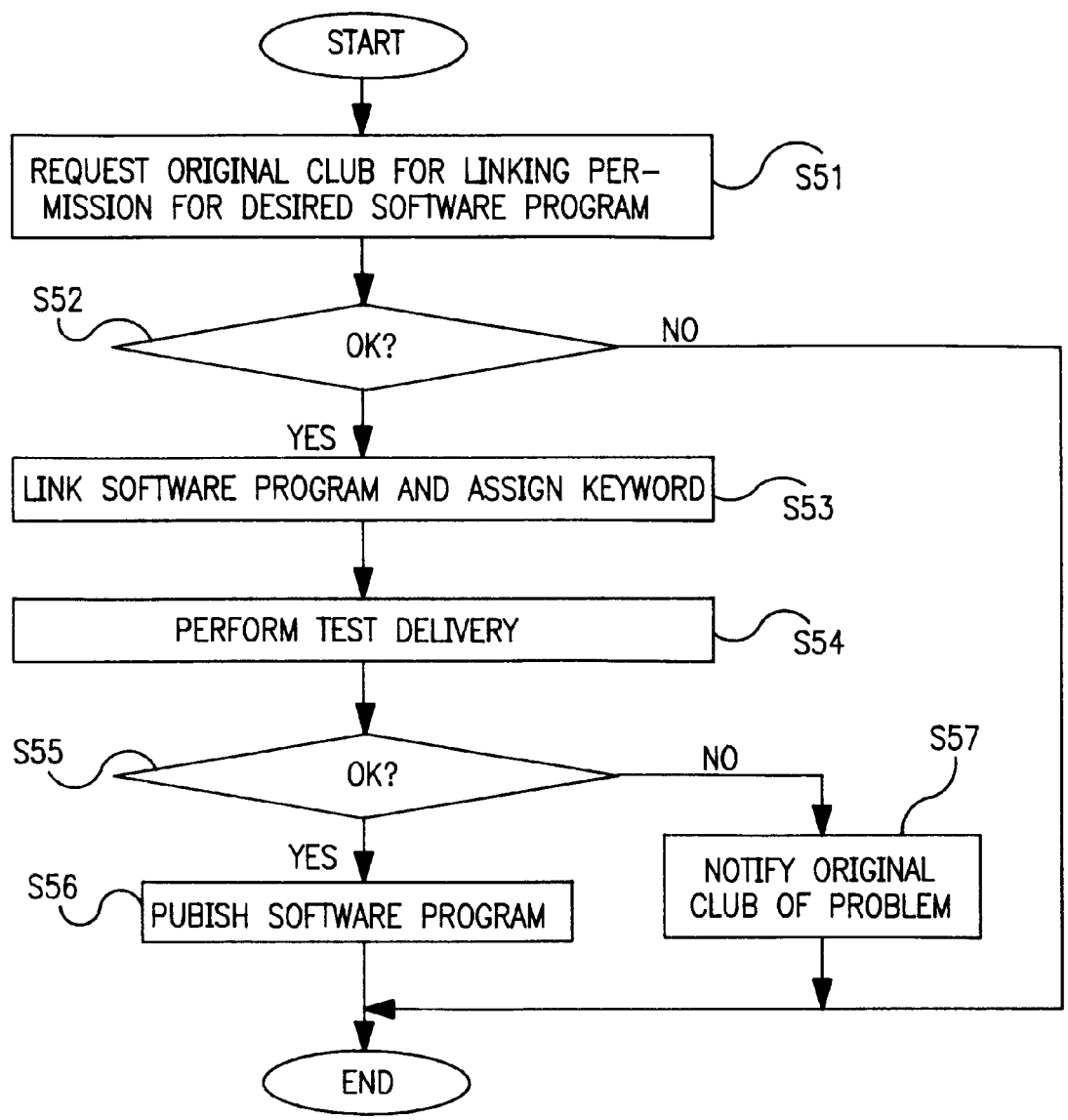
FIG. 22 is an operating flow chart showing operations of a supervisor of a linked club.

FIG. 22 is an operating flow chart showing the operation of a supervisor of a linked club. In FIG. 22, after the operation is started, when the supervisor of the linked club finds a desired software program, he sends a linking request to the original club (at step S51) and receives the reply of the request (at step S52). When the original club does not permit the linking request, the supervisor finishes the operation. When the original club permits the linking request with the command PERMISSION, the supervisor of the requested club links the software program with the command LINK (at step S53). At this point, the supervisor changes keywords so that members of the club can easily search for the software program.

Thereafter, the supervisor of the linked club performs a test delivery of the software program (at step S54) and checks whether or not the software program is normal (at step S55). When the software program is normal, the supervisor of the linked club publishes the software program to the members of the club with the command PUBLISH (at step S56). When the software program has a problem such as a bug, the supervisor of the linked club notifies the original club of the problem (at step S57). Thus, the supervisor finishes the operation.

When a software program is registered to the host computer 63 through the network 62 at step S32 shown in FIG. 20, the format of information to be uploaded is standardized. As a practical uploading method, information is standardized and categorized. The standardized and categorized information is sent with a tag that represents the content of the information. When the information is standardized, the registering operation and the checking operation can be automatically performed. Since information to be uploaded is categorized, when an error such as a bug is detected, only the error portion needs to be re-sent. Thus, the uploading time can be remarkably reduced. The upload information can be largely categorized into the following five types.

(1) CFG file (configuration file): Fundamental information necessary for registering a software program to the system. The CFG file includes:

Information registered to a database

Content (software program) name

Old version and current version (not mandatory) of the content

Sales type (freeware/shareware/sales item)

Price

Required hardware

Required OS

Search keyword

Information of the install process

Content compressing method

Install method

Information of any pre-process and post-process for the install operation

Presence/absence of pre-process and method

Presence/absence of post-process and method (2) Descriptive file: Description of the summary of a software program (mandatory information)

(3) Main file: Compressed file necessary for executing a software program (mandatory information)

(4) CHK file (check file): A file written in a special language for checking the environment conditions of a software program and modifying the remote install operation. This file is required only for an environment dependent software program. Common CHK files are provided by the system. However, a special CHK file should be created by the user. Each CHK file contains, for example CHKEXE: An execution program for optionally performing an environment check or information thereof VERSION: Created when the version information of a DLL (dynamic link library) should be optionally checked Information such as the check script 40 shown in FIG. 3 may be contained in a CHK file.

(5) Install related file: A file containing a practical procedure for a remote install. The install related file contains the following information.

INSTALL: A practical install procedure (not required when the procedure is standardized) The standardized install operation is performed in the following manner, and most software programs can be installed correspondingly thereto.

1. Perform the pre-process, if necessary.

2. Download the compressed main file to the working area of the terminal.

3. Decompress the main file and copy the resultant files to a suitable directory of the terminal.

4. Change the file attributes if necessary.

5. Register the software program to the menu and/or as an icon if necessary.

6. Perform the post-process, if necessary. ICON: Information for registering the software program to a menu or a manager.

FIRST: A pre-process performed before the standard install process is performed. For example, in a version-up process, this pre-process is a backup process of the old version.

LAST: A post-process performed after the standard install process. For example, this post-process is a rewrite process of the environment variable file CONFIG.SYS.

Figure 23:
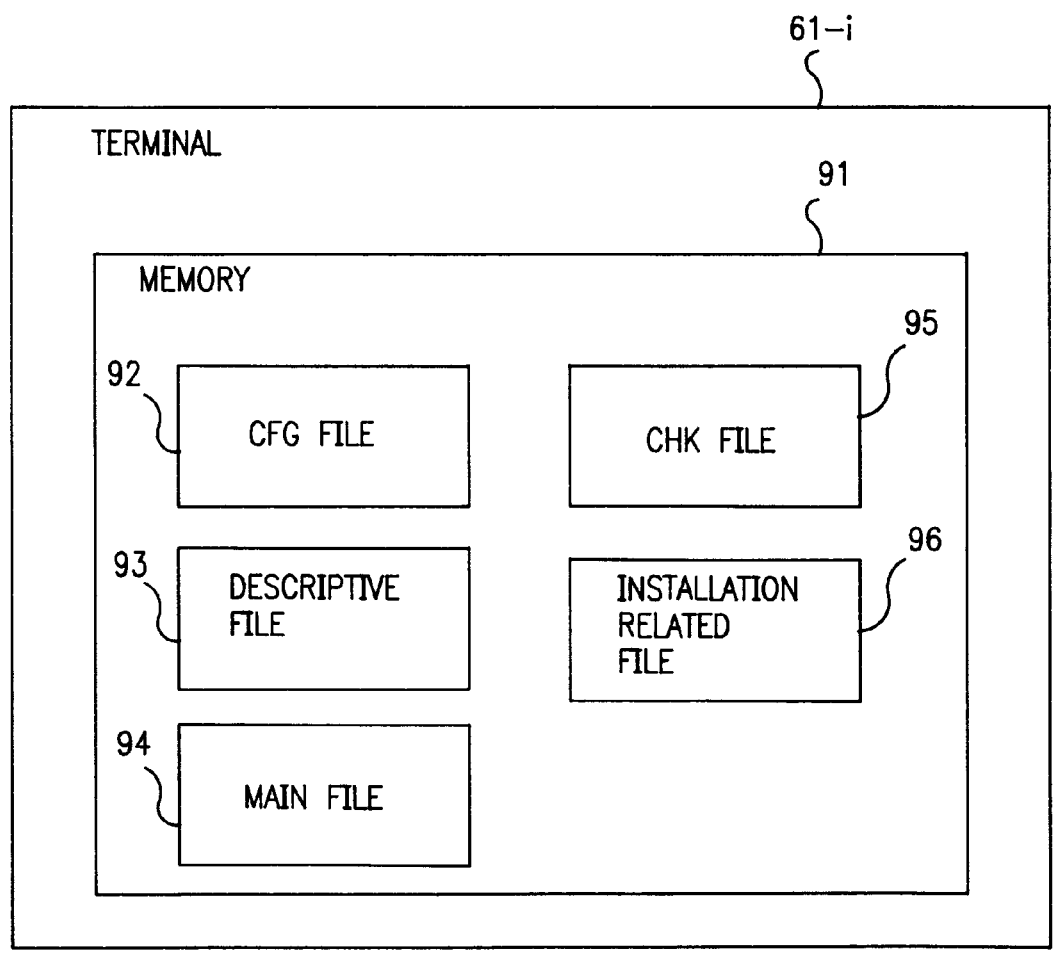
FIG. 23 is a schematic diagram showing a file group generated on a terminal.

FIG. 23 is a schematic diagram showing an example of a file group generated on a terminal 61-i (where i=1, 2, ..., N) at step S31 in FIG. 20. In FIG. 23, in a memory 91, a CFG file 92, a descriptive file 93, a main file 94, a CHK file 95, and an install related file 96, are generated and uploaded to the host computer 63.

Next, with reference to FIGS. 24 to 31, practical examples of files are described. FIGS. 24 to 27 show an example of the CFG file 92. FIGS. 28 to 32 show an example of the descriptive file 93, the main file 94, the CHK file 95, and the install related file 96, respectively.

In the CFG file shown in FIGS. 24 to 27, a line starting with a semicolon ";" represents that the line is a comment statement. In FIG. 24, [name] represents a name for searching a software program. In this example, [name] is "shinwapuroeini" (that is Japanese meaning "new wordprocessor As"). As in the case shown in FIG. 24, since Japanese characters are ideographic characters, both a software program name and the pronunciation thereof are required. However, as with English, when characters nearly accord with the pronunciation thereof, the pronunciation can be omitted. [version] represents the version of the software program. [oldversion] represents an old version of the software program. [type] represents a sales type. In this example, [type] is SHARED, that represents the software program is shareware. [price] represents the price of the software program. [machine] represents the required hardware. In this example, four types of hardware, namely TOWNS, FMR, PC98, and PC-AT, are written.

Figure 5:
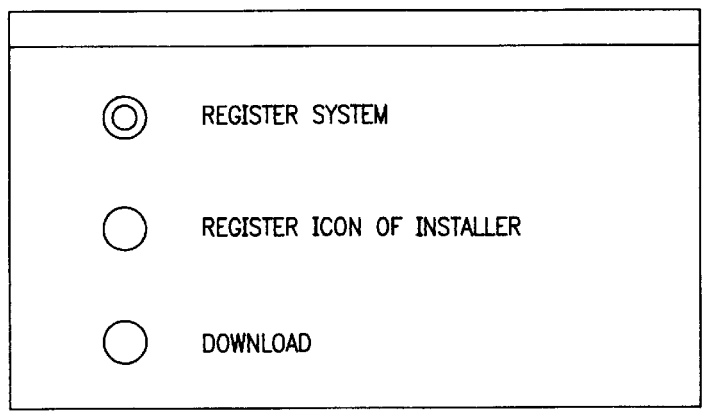
FIG. 5 is a schematic diagram showing an example of an install method selecting window.
Figure 9:
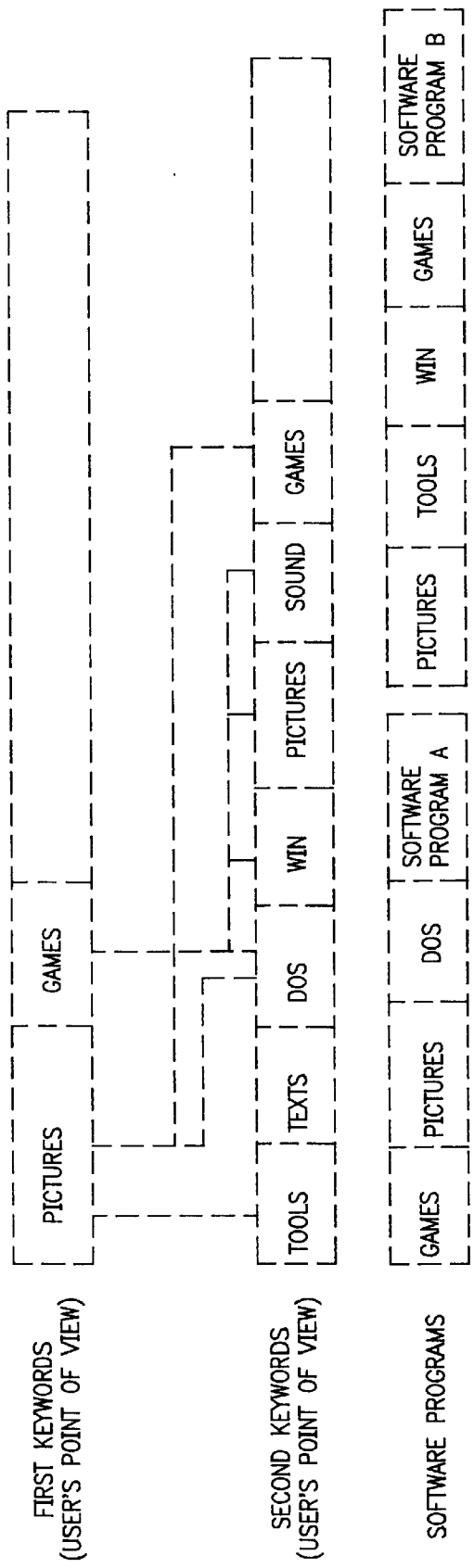
FIG. 9 is a schematic diagram showing an example of keywords displayed on a screen of a display unit.
Figure 12:
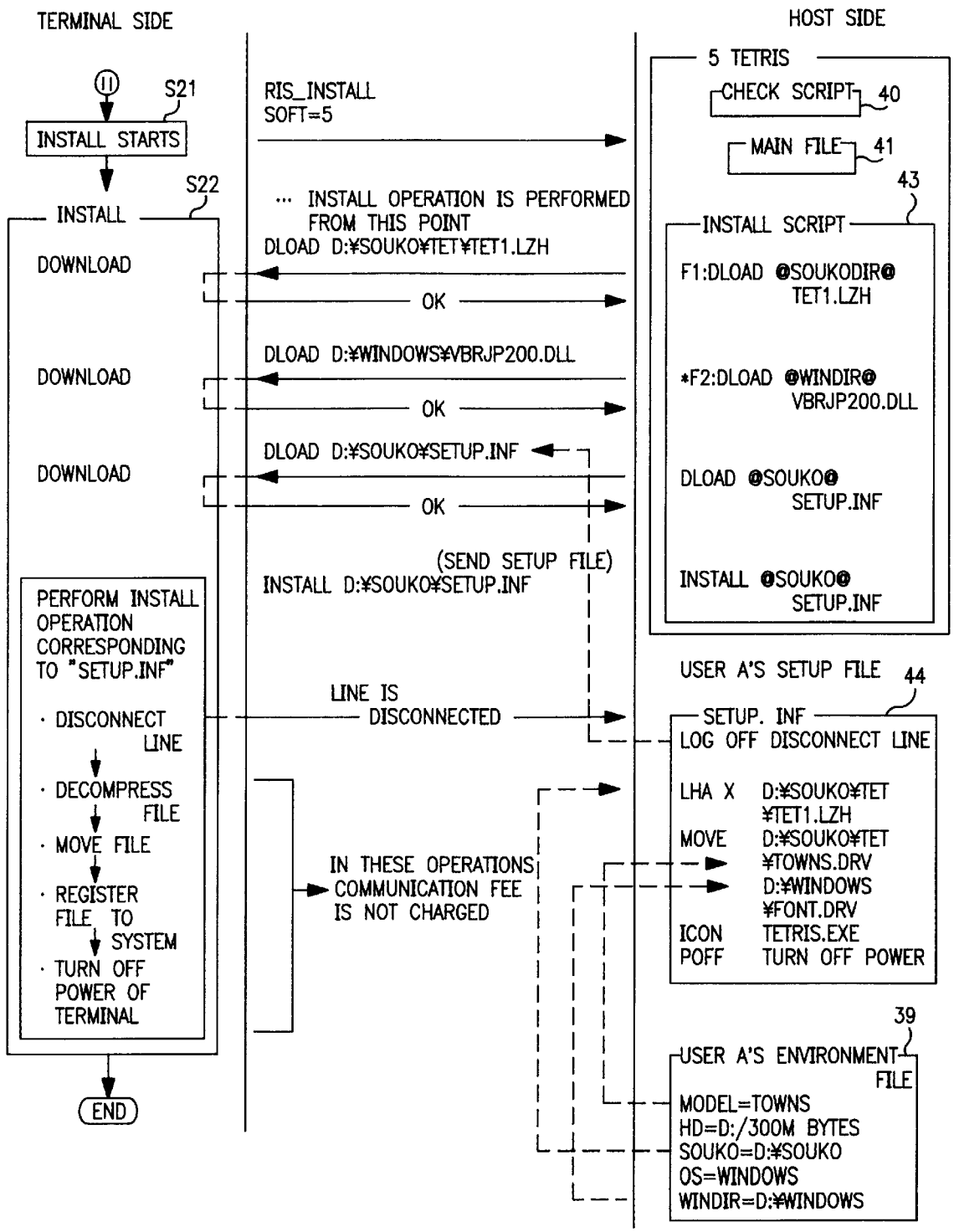
FIG. 12 is an operating flow chart showing a process for performing an automatic install.

In FIG. 25, [os] represents a required OS. In this example, only WIN31J (Japanese Windows 3.1) is written. [key] represents a searching keyword. In this example, "Chinese" is written as a keyword. [compression] represents a compression type of the main file. In this example, the LHA method is written. [instype] represents an available remote install method. [RIS icon.def] represents that the software program is registered to an icon file "icon.def" by the normal remote install, as described in the section of the related art reference shown in FIG. 5. [INSTALLER icon2.def] represents a method for registering the installer "INSTALL.EXE" as an icon. [DLOAD] represents download.

In FIG. 26, [souko] represents a recommended directory in which a software program is stored when it is installed. In this example, two directories P1 and P2 are written.

[source] represents information of a compressed main file (archive file). In this example, two archive files S1 and S2 are written. In this example, the file name of S1 is "NEW-WP.LZH". The storage directory of the file that has been decompressed is "@P1@" designated by [souko] (or "@IC#SOUKO@¥ABC" in the case of the file shown in FIG. 26). The mode of the file that has been decompressed is M. The storage capacity of the file is 800000 bytes. The minimum storage capacity of the decompressed file is 2000000 bytes. The file name of S2 is "NEWWPLIB.LZH". The storage directory of the file that has been decompressed is "@P2@" designated by [souko] (or "@WORK@" in FIG. 26). The mode of the file that has been decompressed is F. The storage capacity of the file is 7000 bytes. The minimum storage capacity of the decompressed file is 13000 bytes. The file name for the redundancy check operation is "GSWDLL.DLL".

When the mode M has been designated, the terminal side can change the directory in which the file is decompressed. When the mode F has been designated, the terminal side cannot change the directory. "GSWDLL.DLL" is one of files compressed in the archive file "NEWWPLIB.LZH" and is used to check whether the same file name exists in the terminal.

[destination] represents a special directory in which a file is decompressed. In this example, "@WINSYSTEM@" is written as D1. [copy] represents information of a file or the like to be moved when it is installed. In this example, the file "GSWDLL.DLL" contained in the archive file designated as C1 with S2 is moved to the directory designated by D1 with the same file name. N of ATTr field represents that the attribute is not changed after the file is moved.

In FIG. 27, [first] represents information of a pre-process. In this example, a command to be executed before an archive file is downloaded is written. [last] represents information of a post-process. In this example, a command to be executed after an icon registering command is executed is written.

FIG. 28 is the content of a descriptive file. The descriptive file contains information for explaining the summary of "new wordprocessor A2" software in the CFG file shown in FIGS. 24 to 27. FIG. 29 is a program code list showing main files (archive files) necessary for executing a software program. In FIG. 29, an archive file "NEWP.LZH" contains three files "WP.EXE", "NEWWP.ICO", and "README.DOC". An archive file "NEWWPLIB.LZH" contains a file "GSWDLL.DLL".

FIG. 30 is a program code list showing a portion corresponding to a CHK file. This portion corresponds to the check script for the environment check operation performed when a software program is installed. In this example, this portion contains processes for checking whether the file "WP.EXE" is present in the terminal of the user (MQ1, MA1), checking whether the file "WP.EXE" is the latest version if it is present (MQ2, MA2), and performing an operation corresponding to the check result.

FIG. 31 is a program code list showing an ICON file that is an install related file 96. The ICON file shown in FIG. 31 contains the execution file name of "new wordprocessor A2" (necessary for registering the software program as an icon), the current working directory, and the file name of the icon registering file. The ICON file is used when a software program is registered in the system by the remote install operation.

With the above-described software registering/managing system according to the embodiment, the following services are performed.

(a) A software program content in which an upload user has not requested to publish a software program, and a software program content in which the upload user has requested to publish the software program, are distinguished. A test flag that represents whether or not the software program has been requested to be published is added to a delivery request. When a upload user performs a test delivery for testing a software program that he has uploaded, he initiates the test flag. The software content that has not been published is downloaded. When the software program has an error, only the error portion is uploaded again. After the software content has been published, the software program is prohibited from being modified.

When a supervisor or a upload user initiates the test flag and requests the test delivery, a remote install can be performed without a fee.

(b) With the relationship between software program codes stored in the commodity database 81 and the original clubs, a user can obtain a list of original clubs and linked clubs (they are the support clubs) and directly access the support clubs. This is a matter of MMI (man-machine interface). However, in the case that a user wants to have support for a software program, when he selects a software name, he can determine the support clubs thereof. Thus, the user can access a support location with one operation.

(c) When support clubs are presented to a user, the original club is displayed at first so that the original club has a higher priority than the other support clubs. Generally, creators of software programs tend to upload the programs to clubs with supervisors who have high support capability. Thus, such clubs tend to become original clubs. When original clubs are listed on the MMI at first, users can easily access clubs with supervisors who have high support capability. The income of the supervisors is proportional to the number of members who access their clubs. Thus, such supervisors are highly rewarded.

(d) Each member of each club can perform a remote install for a desired software program in the club that they have joined. In consideration of the case that a required software program is found in a discussion group in a conference room, the RIS (remote install system according to the related art reference) function is provided for each club as shown in FIGS. 16 and 17. In this case, the searching keywords can be changed for each club. Thus, the remote install operation can be performed using the characteristics of each club.

(e) After a software program is uploaded and until it is permitted to be published, a validity check including such as a syntax check, a virus check, a copyright check, a registered trademark check, and a software program name redundancy check, is performed. Since the upload format of each software program has been standardized, the validity check can be automatically performed. The host computer 63 stores character strings and software program code lists that are determined as errors, except for the syntax check. Upload information is compared with such character strings and program code lists. If a match is detected, an alarm is issued. The final decision of the results of the validity check may be performed by an authorized person.

The upload information for which the syntax check is performed is, for example, the CFG file 92 (shown in FIGS. 24 to 27), the CHK file 95 (shown in FIG. 30), the INSTALL file, and the ICON file (shown in FIG. 31). The upload information for which the virus check is performed is, for example, the main file 94 (shown in FIG. 29), the CHKEXE file included in the CHK file 95, and the FIRST file and the LAST file included in the install related file. The upload information for which the copyright check and the registered trademark check are performed is, for example, the CFG file 92 and the main file 94.

(f) When a software program that is being tested and that has not been requested to be published is not accessed for a predetermined time period, it is automatically deleted so as to prevent the storage region of the host computer from being wasted. A software program that is being tested is stored in a disk unit of the host computer 63 for a predetermined period so that a changed portion of the software program due to a debugging operation or a modifying operation can be uploaded. After the predetermined time period elapses, the software program is automatically deleted from the disk unit. This service is accomplished in the following manner.

For example, as with the new wordprocessor A2 shown in FIG. 18, a software program code that represents TMP (temporary) starts with "9". Thus, the commodity database 81 is periodically checked for the last access date and time of software programs with the software program code TMP. After the predetermined time period elapses, these software programs are deleted.

Next, with reference to FIGS. 32 to 41, practical examples of such services will be described.

Figure 32:
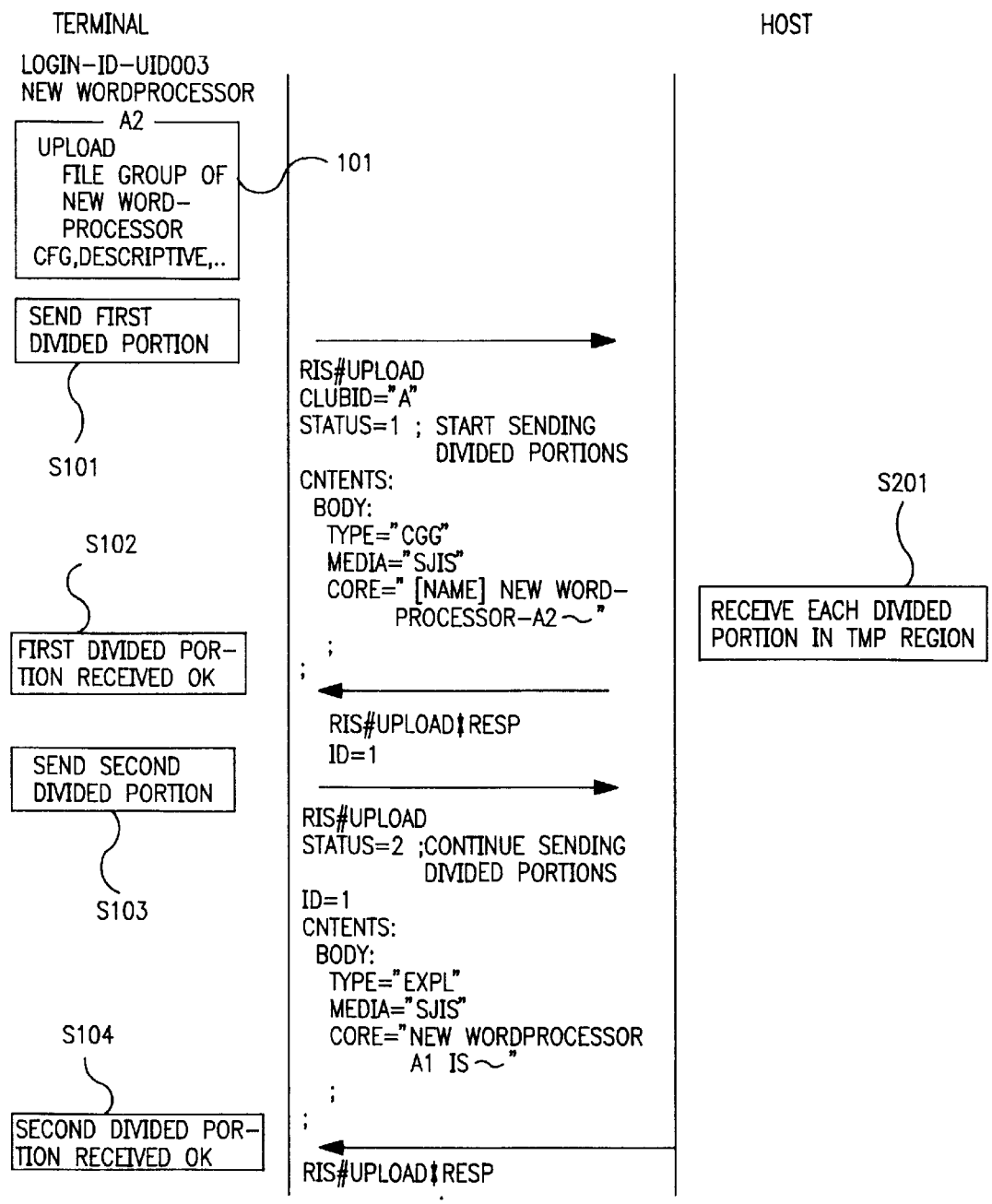
FIG. 32 is an operating flow chart showing an example of a process for uploading a software program (No. 1)
Figure 33:
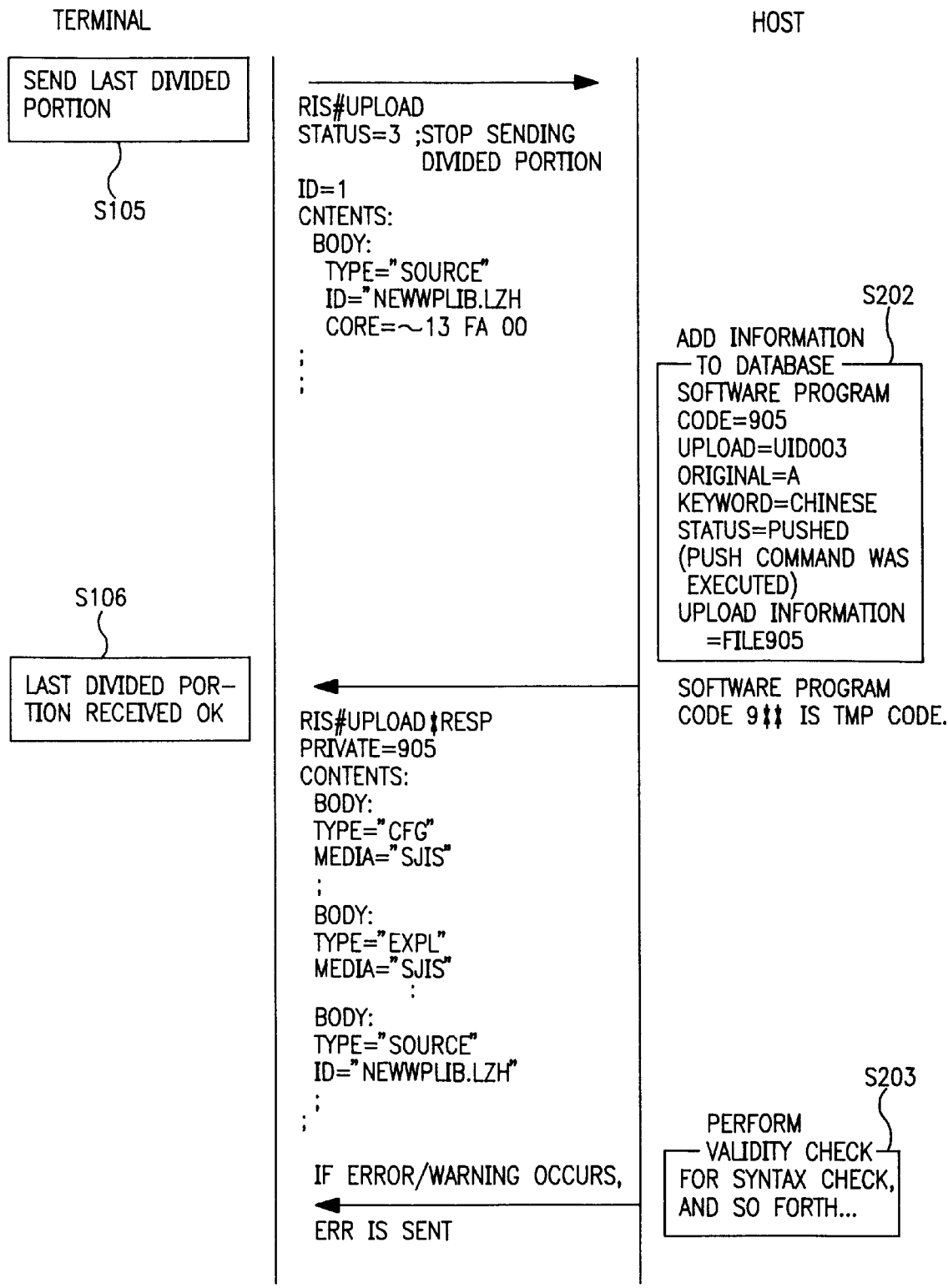
FIG. 33 is an operating flow chart showing the example of the process for uploading the software program (No. 2)

FIGS. 32 and 33 show an example of an upload process of a created file group. In FIG. 32, with the command UPLOAD, a creator of a software program "new wordprocessor A2" divides the software program into files corresponding to their types and sends the divided files to the host computer 63. As a first portion, the creator sends a CFG file (at step S101). The host computer 63 receives the CFG file and stores it in a TMP region of a disk unit (at step S201). When the creator receives a message "OK" as the result of receiving the first divided portion (at step S102), he sends a descriptive file as a second divided portion (at step S103). When the creator receives a message "OK" as the result of receiving the second divided portion (at step S104), he sends a file as a third divided portion. When the creator sends a main file as the last divided portion (at step S105 shown in FIG. 33), the host computer 63 adds management information of the uploaded file group to the commodity database 81 (at step S202).

Thus, information in which the software program code of the software program that has been uploaded is 905, the upload user ID is UID003, the original ID is A, and the keyword is Chinese, is registered to the commodity database 81. The three-digit software program code starting with "9" represents that the software program is under test (TMP).

When the creator receives a message "OK" as the result of receiving the last divided portion from the host computer 63 (at step S106), he finishes the operation. At this point, the creator receives the software program code (TMP code) 905 that represents that the uploaded software program is a temporary software program, from the host computer 63. Subsequently, the host computer 63 automatically performs the validity check for the uploaded files (at step S203). When the host computer 63 detects an error in the uploaded files as a result of the validity test, the host computer 63 sends a message that represents the files has an error to the terminal of the creator.

Figure 34:
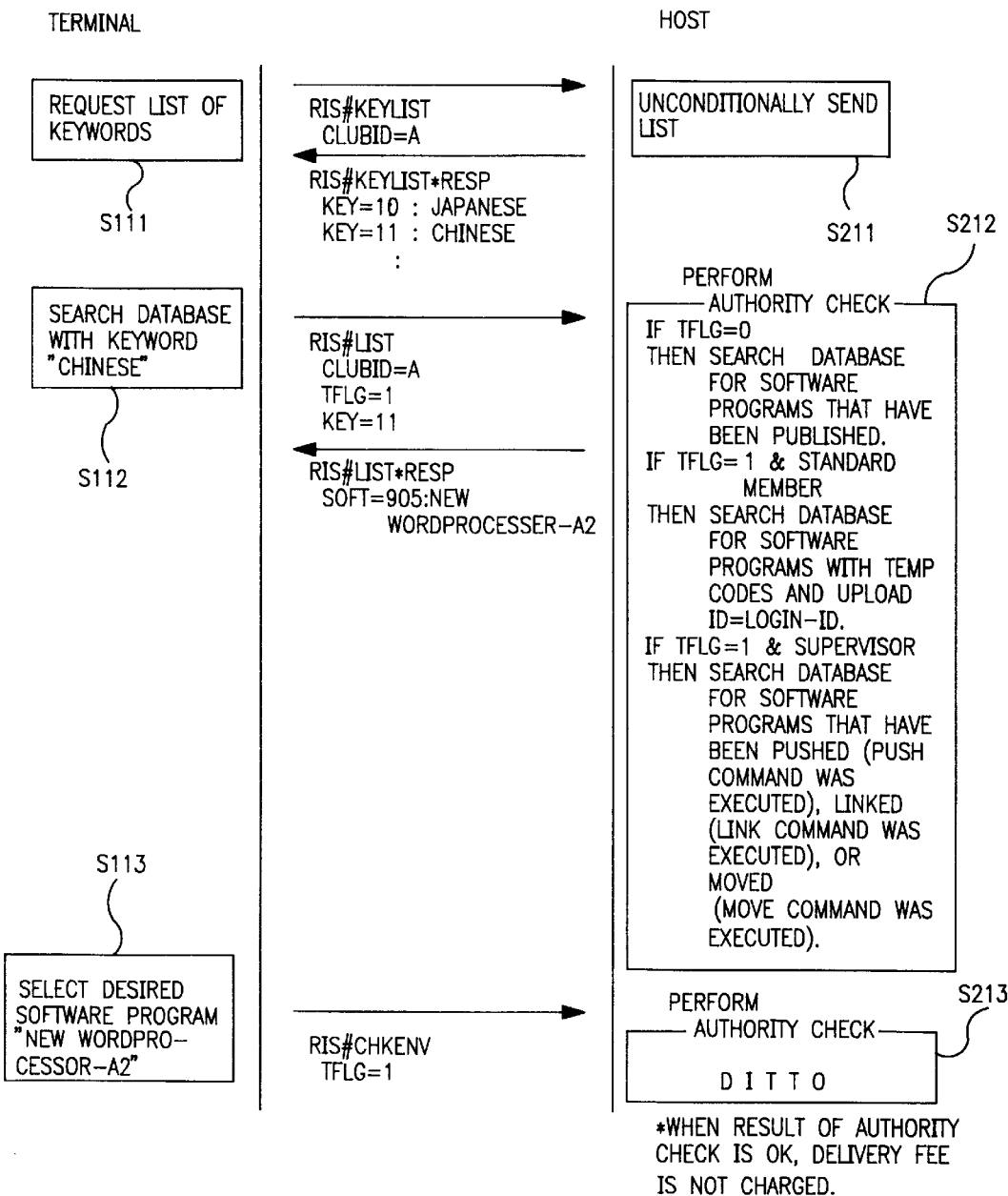
FIG. 34 is an operating flow chart showing an example of a process for performing a test delivery.

FIG. 34 is an operating flow chart showing an example of a test delivery for an uploaded software program. A test flag (TFLG) is provided for the protocol that requests searching for a desired software program in the remote install according to the related art reference, so as to check the authority of the test delivery. Thus, only an authorized person such as an upload user of a software program can see a software program that has not been published.

In FIG. 34, when a creator or a supervisor requests the host computer 63 for a list of keywords from his terminal (at step S111), the host computer 63 unconditionally sends back the list to the creator or the supervisor (at step S211). When the terminal sends a searching request with TFLG=1 and a keyword "Chinese" to the host computer 63, it performs an authority check (at step S212).

In the authority check, the host computer 63 checks the value of the test flag. When TFLG=0, which represents that the request has been issued from an unauthorized person, the host computer 63 searches the commodity database 81 for only published software programs. On the other hand, when TFLG=1 which represents that the request has been issued from an authorized person and the requester is a standard member, the host computer 63 searches the commodity database 81 for software programs with TMP codes on the condition that the upload user ID accords with the login ID. When TFLG=1 and the requester is a supervisor, the host computer 63 checks the statuses of the software programs in the commodity database 81 and searches the commodity database 81 for those that have been published, linked, and moved. When TFLG=0, the host computer 63 determines the result of the authority check as "NG" and charges the requester for the delivery fee. On the other hand, when TFLG=1, the host computer 63 determines the result of the authority check as "OK" and does not charge the requester for the delivery fee.

Figure 3:
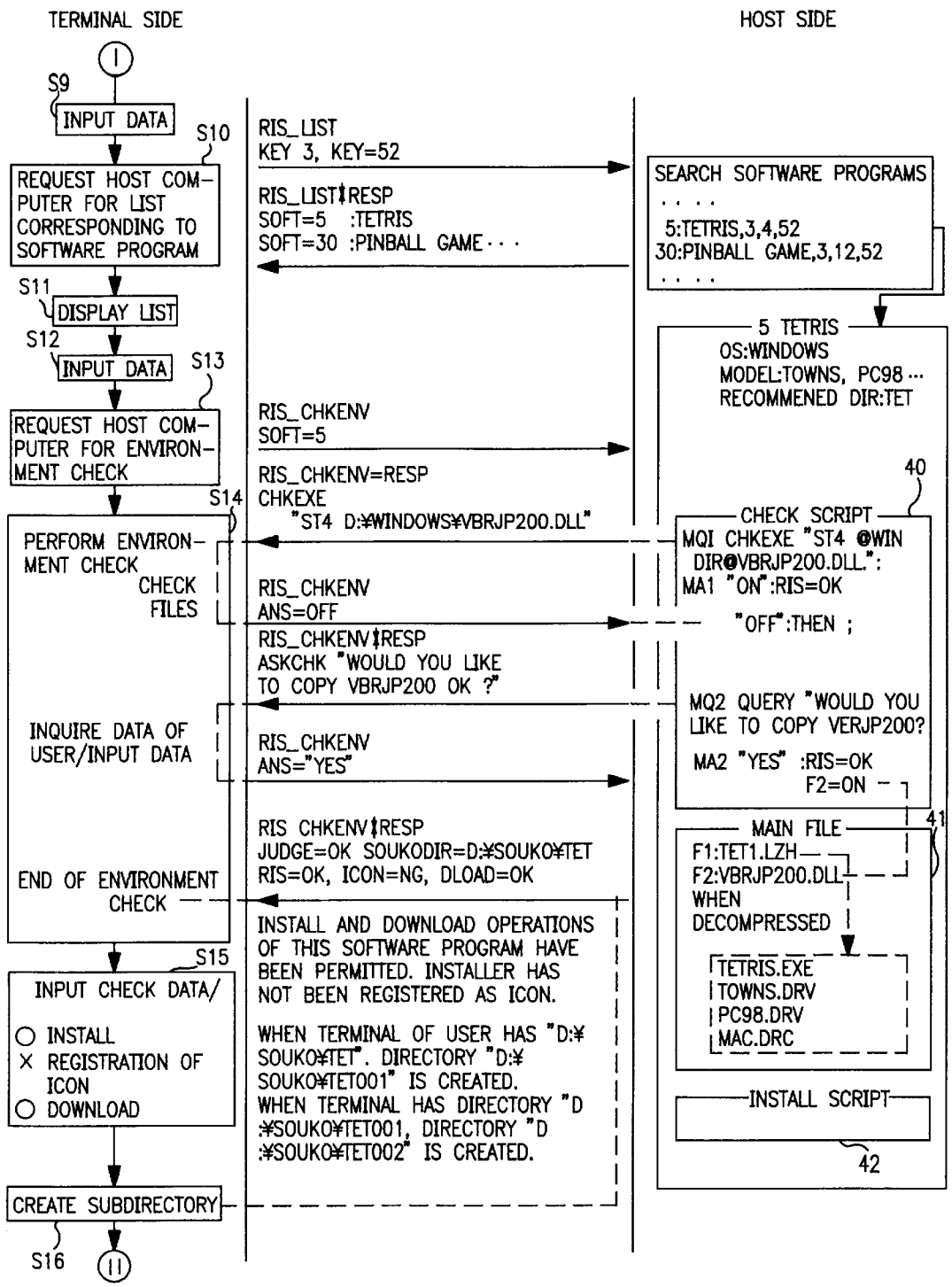
FIG. 3 is an operating flow chart showing the process for performing the remote install (No. 2)
Figure 4:
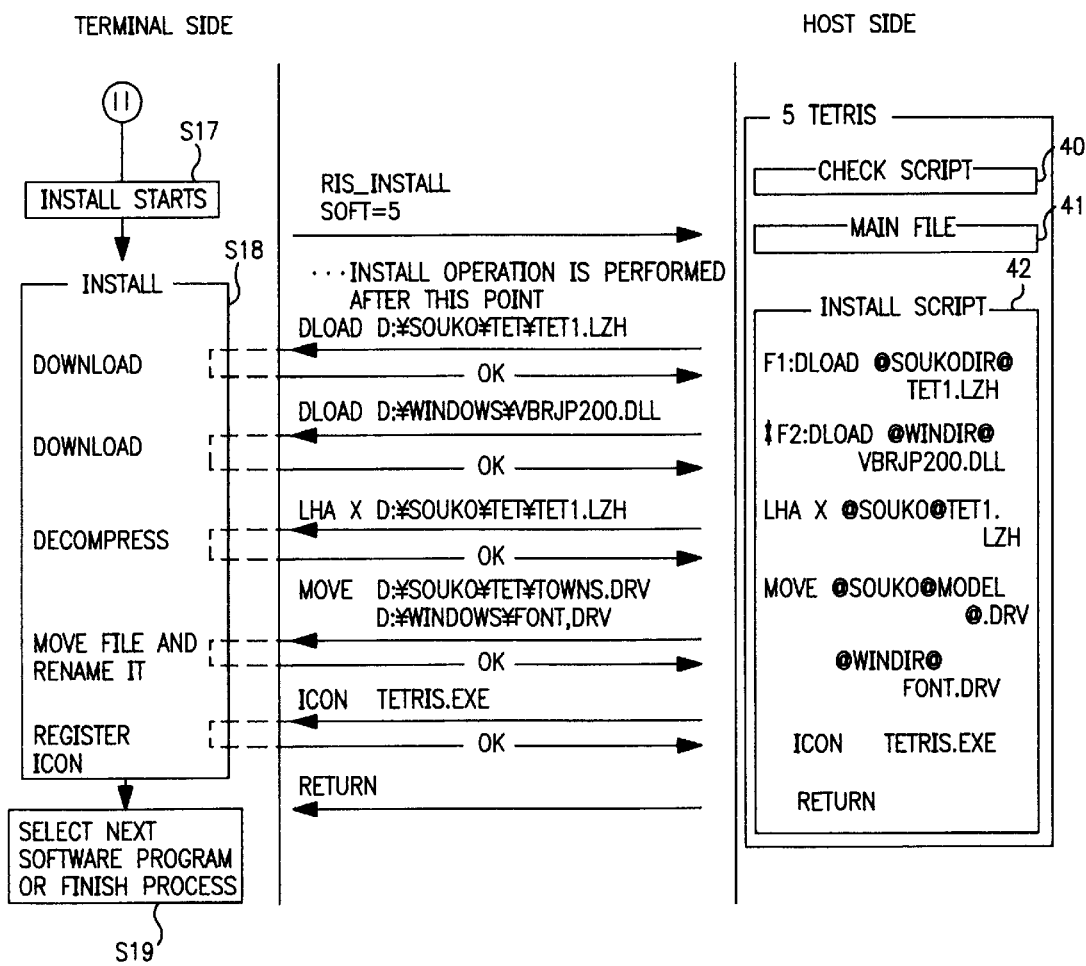
FIG. 4 is an operating flow chart showing the process for performing the remote install (No. 3)

In this example, since the request is issued from an authorized creator or an authorized supervisor and TFLG=1, the requester is not charged for the delivery fee. Thereafter, the requester selects the desired "new wordprocessor A2" from the searched software programs and requests the host computer 63 for an environment check with TFLG=1 (at step S113). The host computer 63 performs an authority check as with step S212 (at step S213). Thereafter, the operation after step S14 shown in FIG. 3 is performed. When an error takes place while the test delivery is being performed, the requester handles the error according to a suitable one of the operating flow charts shown in FIGS. 20, 21, and 22.

Figure 35:
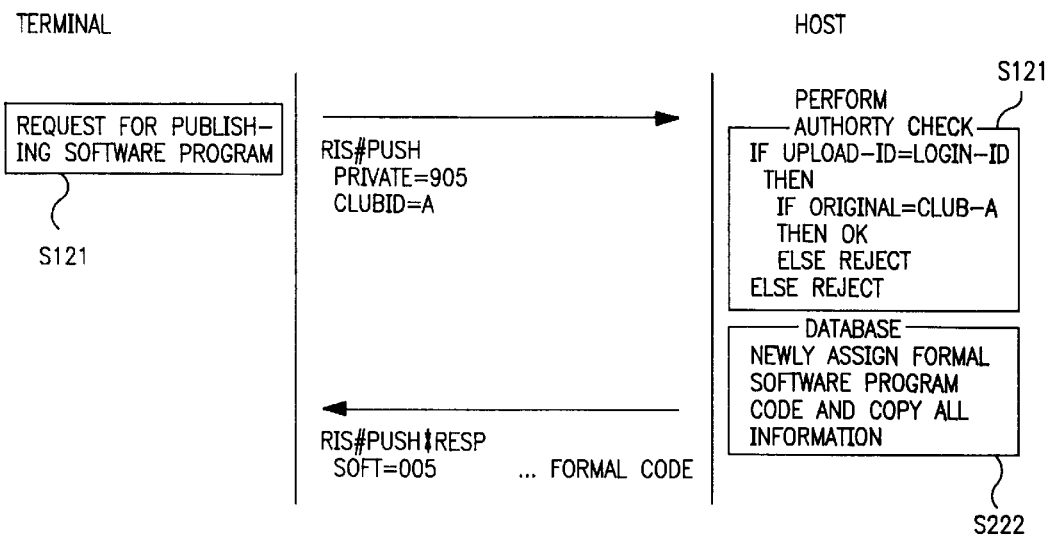
FIG. 35 is an operating flow chart showing an example of a process for issuing a publishing request.

FIG. 35 is an operating flow chart showing an example of a process for requesting to publish a software program that has been passed for a test delivery. In FIG. 35, with the command PUSH, a creator of a software program requests (permits) the host computer 63 to publish the software program 905 that has been passed for a test delivery (at step S121). The host computer 63 performs an authority check (at step S221). At this point, the host computer 63 references the commodity database 81. When the upload ID of the software program 905 accords with the login ID of the requester and the original club ID accords with the club ID sent along with the request, the host computer 63 accepts the publishing request. Otherwise, the host computer 63 rejects the publishing request. When the host computer 63 accepts the publishing request, it assigns a formal software program code (005) and copies the management information of the software 905 in the commodity database 81 (at step S22) and sends the software program code (005) to the terminal.

Figure 36:
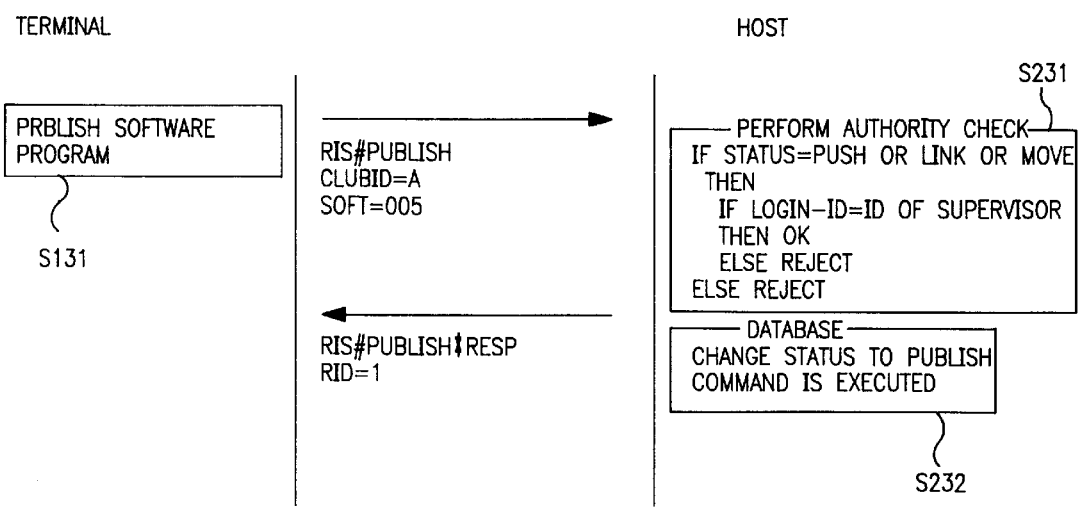
FIG. 36 is an operating flow chart showing an example of a process for publishing a software program.

FIG. 36 is a flow chart showing an example of a process for publishing a software program that has been permitted to be published. In FIG. 36, with the command PUBLISH, a supervisor of a club requests the host computer 63 to publish a software program with a software program code (005) (at step S131). The host computer 63 performs an authority check (at step S231). The host computer 63 references the commodity database 81. When the status of the software program with the software program code (005) is published (PUSHED), linked (LINKED), or moved (MOVED) and the login ID of the requester accords with the ID of the supervisor, the host computer 63 accepts the publishing request. Otherwise, the host computer 63 rejects the publishing request. When the host computer 63 accepts the publishing request, it changes the status of the software program with the software program code (005) to PUBLISHED and publishes the software program (at step S232).

Figure 37:
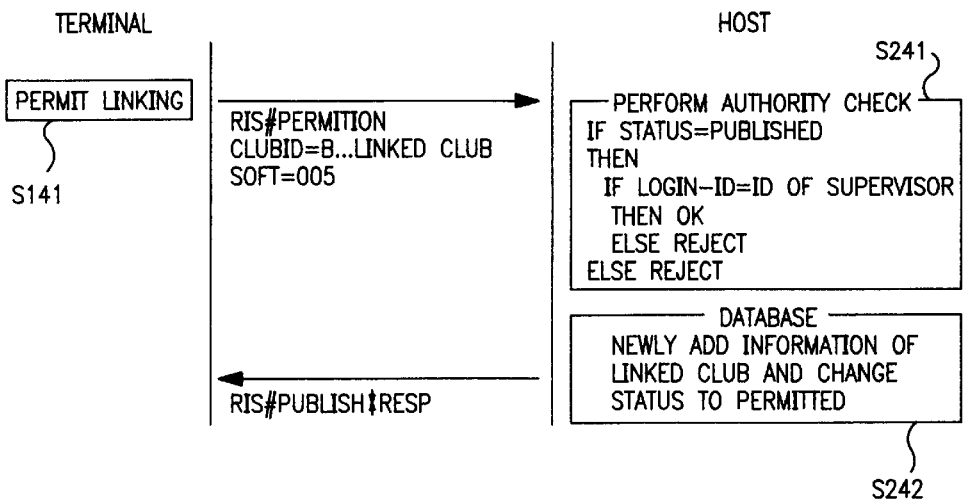
FIG. 37 is an operating flow chart showing an example of a process for issuing a linking permission.

FIG. 37 is an operating flow chart showing an example of a process for permitting to link a published software program to another club. In FIG. 37, with the command PERMISSION, the supervisor of an original club permits linking of a software program with a software program code (005) to a club B (at step S141). The host computer 63 performs an authority check (at step S241). At this point, the host computer 63 references the commodity database 81. When the status of the software program with the software program code (005) is published, and the login ID accords with the ID of the supervisor, the host computer 63 accepts the linking permission. Otherwise, the host computer 63 rejects the linking permission. When the host computer 63 accepts the linking permission, it newly adds information of the linked club (the ID of the linked club B) to the management information of the software program with the software program code (005) in the commodity database 81 and changes the status to PERMITTED (at step S242).

Figure 38:
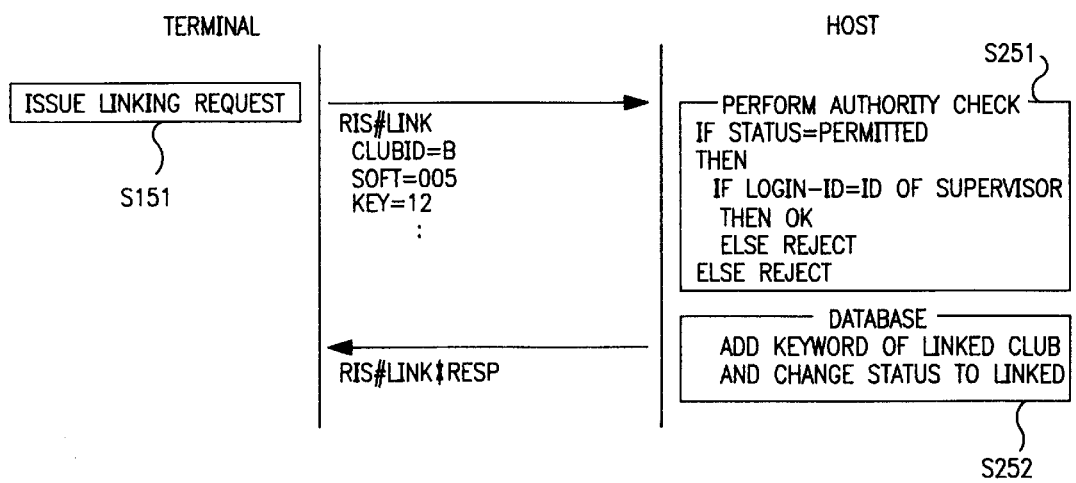
FIG. 38 is an operating flow chart showing an example of a process for linking a software program.

FIG. 38 is an operating flow chart showing an example of a process for linking a software program that has been permitted to be linked to another club. In FIG. 38, with the command LINK, the supervisor of a club B requests the host computer 63 to link a software program with a software program code (005) to the club B with a keyword thereof (at step S151). The host computer 63 performs an authority check (at step S251). At this point, the host computer 63 references the commodity database 81. When the status of the software program with the software program code 005 is PERMITTED and the login ID of the requester accords with the ID of the supervisor, the host computer 63 accepts the linking request. Otherwise, the host computer 63 rejects the linking request. When the host computer 63 accepts the linking request, it adds the keyword of the linked club to the management information of the software program with the software program code (005) in the commodity database 81 and changes the status to LINKED (at step S252).

Figure 39:
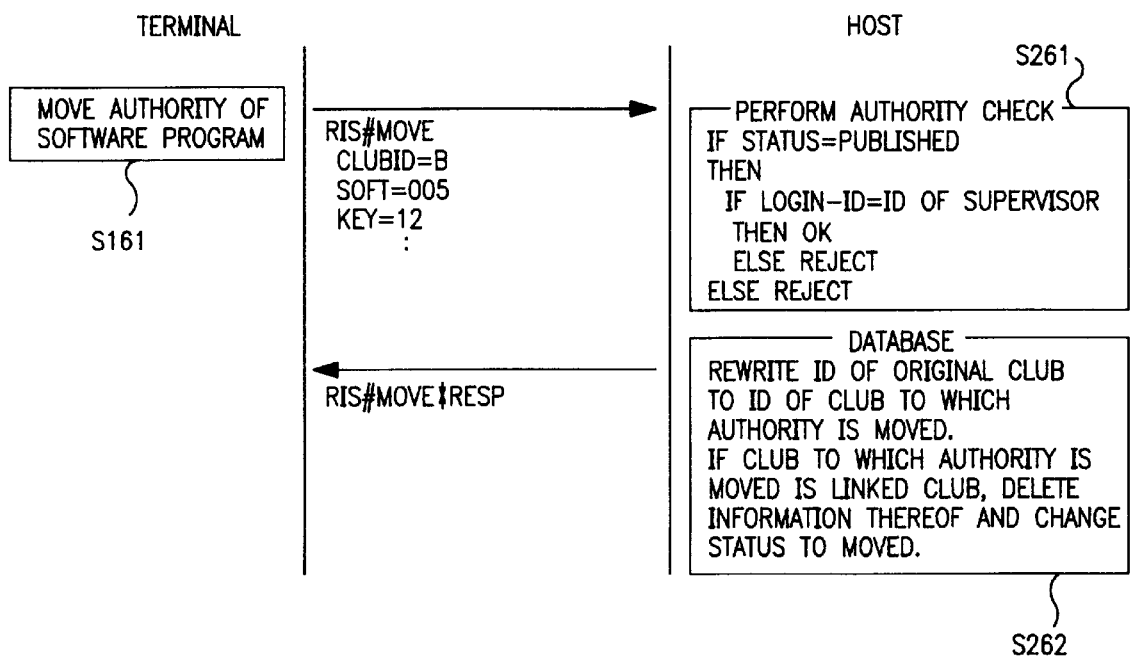
FIG. 39 is an operating flow chart showing an example of a process for moving the authority of an original club.

FIG. 39 is an operating flow chart showing an example of a process for moving the authority of a published software program. In FIG. 39, with the command MOVE, the supervisor of an original club requests the host computer 63 to move the authority of a software program with a software program code (005) to a club B (at step S161). The host computer 63 performs an authority check (at step S261). At this point, the host computer 63 references the commodity database 81. When the status of the software program with the software program code (005) is PUBLISHED and the login ID of the requester accords with the ID of the supervisor, the host computer 63 accepts the move request. Otherwise, the host computer 63 rejects the move request. When the host computer 63 accepts the move request, it rewrites the ID of the original club of the software program with the software program code (005) to the ID of the moved club B (at step S262). At this point, when the club to which the authority of the software program is moved has been registered as a linked club, the host computer 63 deletes the ID of the linked club and changes the status to MOVED.

Figure 40:
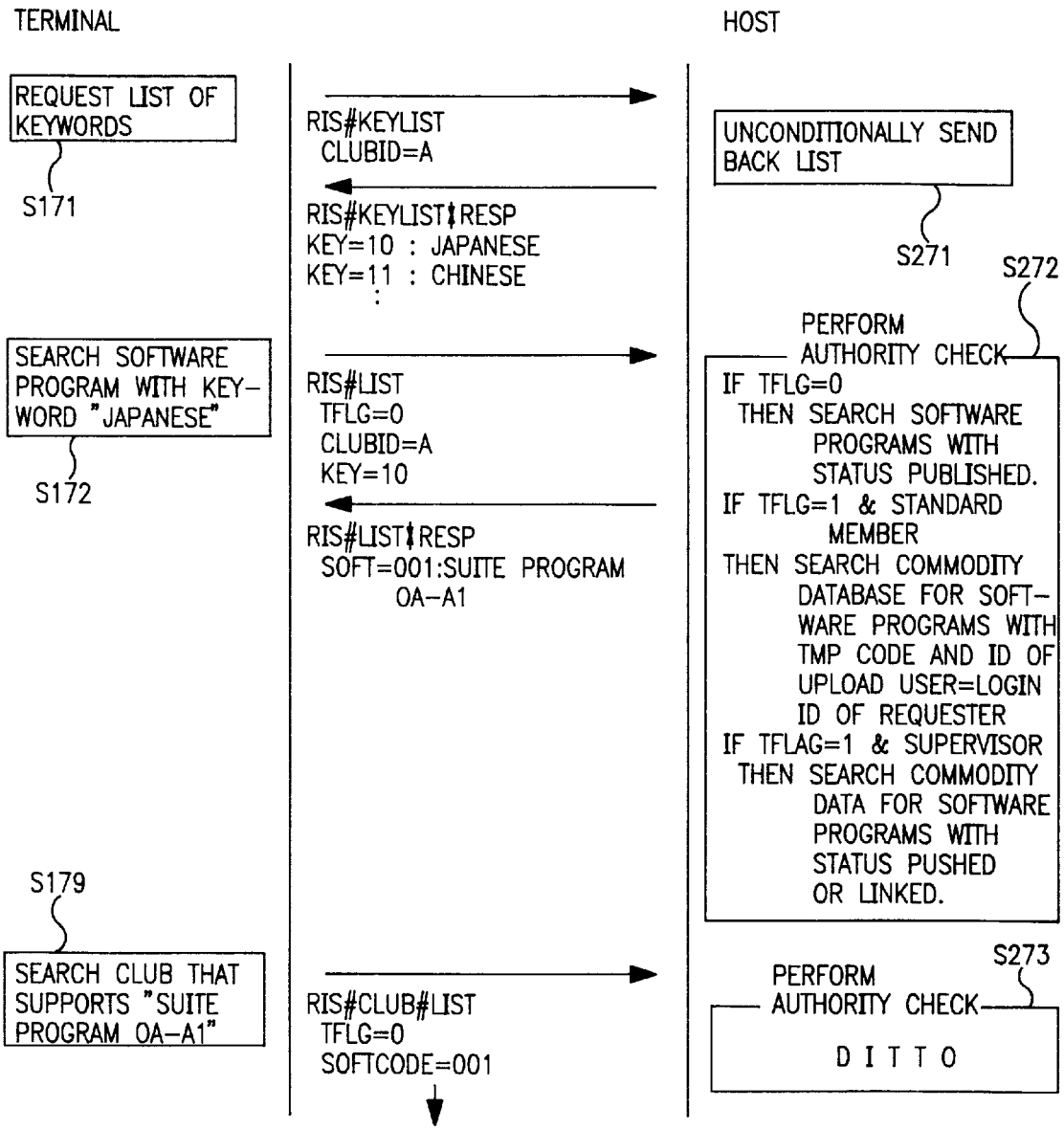
FIG. 40 is an operating flow chart showing an example of a process for moving to a club (No. 1)
Figure 41:
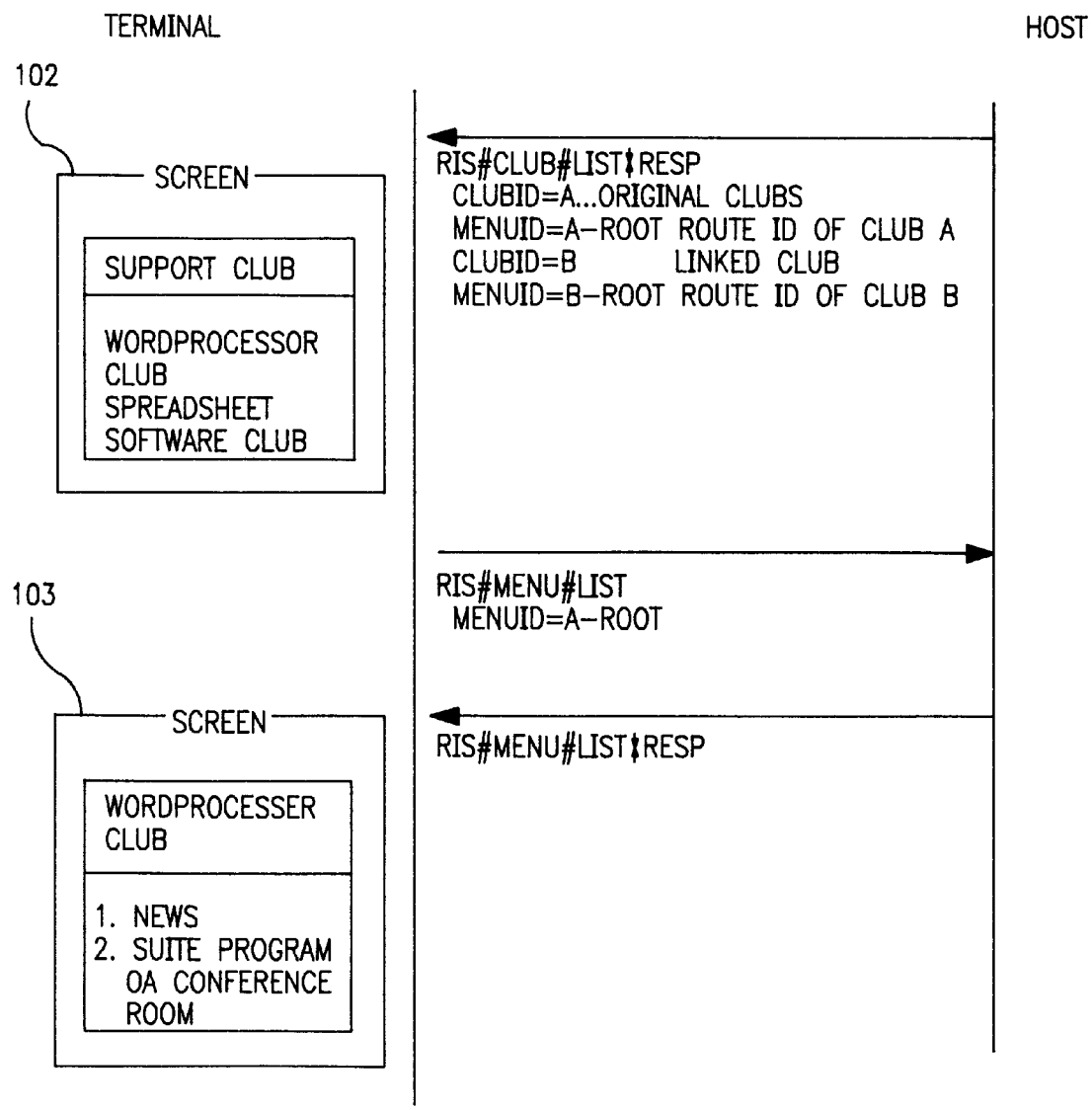
FIG. 41 is an operating flow chart showing the example of the process for moving to the club (No. 2).

FIGS. 40 and 41 are operating flow charts showing an example of a process for moving to a club. In FIG. 40, when a user requests the host computer 63 for a list of keywords (at step S171), the host computer 63 unconditionally sends back the list to the user (at step S271). When the user sends a searching request with TFLG=0 and a keyword "Japanese" to the host computer 63, the host computer 63 performs an authority check as with step S212 shown in FIG. 34 (at step S272). At this point, since TFLG=0, the host computer 63 normally charges the user for the searching request and searches the commodity database for software programs with the status PUBLISHED.

Thereafter, the user selects the suite program OA-A1 from the searched software programs and requests the host computer 63 to search for a club that supports the suite program OA-A1 (at step S173). The host computer 63 performs an authority check as with step S272 (at step S273). Corresponding to the result of the authority check, the host computer 63 references the commodity database 81 and sends back club IDs of support clubs and menu IDs (route IDs) in the order of original clubs and linked clubs as shown in FIG. 41. The relation between the club IDs and the route IDs has been stored in the host computer 63. When the terminal receives such information, the screen 102 of the display unit displays the names of the support clubs in the order of the original clubs followed by the linked clubs. In this example, the "wordprocessor club" that is an original club of the suite program OA-A1 is displayed at first, and then the "spreadsheet club", which is a linked club, is displayed.

Thereafter, when the user selects one of the clubs displayed on the screen, the host computer 63 sends back menu information corresponding to the route ID. In this example, the user selects the wordprocessor club and the display unit displays a menu such as the screen 103. Since all IDs of support clubs have been stored in the commodity database 81, the user can immediately move to an original club and a linked club with the information.

According to the present invention, a software program can be automatically registered from a terminal of a user to the system.

A creator of a software program can freely upload the software program to any club with an upload command. At this point, the upload format of software programs has been standardized and upload information is automatically checked. Thus, the load of a supervisor of a club to which a software program is registered is reduced.

In addition, a software program that is not passed for a virus check, a supervisor's check, and so forth is not published. Thus, software programs can be safely delivered.

Moreover, a highest order club can see all software programs registered in the system. Furthermore, search keywords can be changed club by club. Thus, when a remote install is performed, a desired software program can be easily searched.

In addition, a redundancy check is performed for software programs. Thus, the same software programs are not stored at a plurality of locations of the storage area. Consequently, the storage resource can be effectively used.

As a result, software programs that have been uploaded can be flexibly managed.

Moreover, software programs that have been installed are supported for each club. Thus, when a user selects a club that securely supports software programs, he can securely install a desired software program because it is well-supported by the club.

Furthermore, since software information that has not been published and software information that has been published are separately categorized, a software program can be delivered as a test delivery to an upload user and a club supervisor.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A software registering/managing system, comprising:
   a managing unit that manages registered software programs as one or more program groups and includes one or more management modules as clubs for interacting with said system from any of a plurality of terminals through a communication network, a first club having a conference function for managing registered software programs of a first program group corresponding to the first club and for electronically exchanging information between users of the terminals;
   a storing unit that stores software information uploaded to the first club; and
   an installing unit that automatically installs to a storage region of a requesting terminal a software program of the first program group and corresponding to the software information stored in said storing unit.

2. The software registering/managing system as set forth in claim 1, wherein said managing unit includes respective management modules for a plurality of clubs, including the first club, in a hierarchical structure having a plurality of hierarchical levels including a lowest hierarchical level;

each club included in the lowest hierarchical level is permitted to receive respective software information uploaded thereto; and wherein the software information uploaded to the first club is linked to a second club included in a higher hierarchical level.

3. The software registering/managing system as set forth in claim 1, wherein said managing unit includes respective management modules for a plurality of clubs including the first club, manages the first program group using the first club as an original club, and links the uploaded software information from the original club to a designated club, whereby users interacting with said system through the designated club can see the software information.

4. The software registering/managing system as set forth in claim 1, wherein said managing unit includes respective management modules for a plurality of clubs including the first club, manages the first program group using the first club as an original club, and moves an authority for the uploaded software information from the original club to a predetermined club, whereby users interacting with said system through the predetermined club can see the software information.

5. The software registering/managing system as set forth in claim 1, wherein said managing unit receives a command and performs a process corresponding thereto, the received command comprising one of a first command for uploading the software information, a second command for permitting publishing of a software program corresponding to the software information, and a third command for causing said installing unit to distribute the software program to a user.

6. The software registering/managing system as set forth in claim 1, wherein:

said managing unit includes respective management modules for a plurality of clubs including the first club; and said managing unit receives a command from a club supervisor and performs a process corresponding thereto, the received command comprising one of a fourth command for publishing a software program corresponding to the software information, a fifth command for permitting linking of the software information to a first predetermined club, a sixth command for linking the software information to the first predetermined club, and a seventh command for moving an authority for the software information from the first club to a second predetermined club.

7. The software registering/managing system as set forth in claim 1, wherein said managing unit supplements the software information with identifier information and stores the supplemented software information to the storing unit, the identifier information comprising:

a software information identifier for identifying the software information;

an upload user identifier for identifying a user who uploaded the software information; and an original club identifier for identifying the first club when the software information was registered to the first club.

8. The software registering/managing system as set forth in claim 7, wherein said managing unit includes respective management modules for a plurality of clubs and the identifier information further comprises at least one of:

a linked club identifier for identifying a linked club having the software information linked thereto;

a keyword used in the linked club for searching for a software program corresponding to the software information; and a last access date/time of the software information.

9. The software registering/managing system as set forth in claim 7, wherein:

said managing unit separately manages a first software publication identifier for identifying that an unpublished software program corresponding to the software information and a second software publication identifier for identifying a published software program corresponding to the software information; and said installing unit installs the unpublished software program when said managing unit receives a test delivery request from the upload user, and controls said managing unit to receive a corrected portion from the upload user and corrects the software program in accordance with the corrected portion when an error is detected.

10. The software registering/managing system as set forth in claim 9, wherein said managing unit permits said installing unit to install a specified software program without a fee when:

said managing unit receives a delivery request for the specified software program, the delivery request including a test flag;

the requester is the upload user or a club supervisor; and the test flag is ON.

11. The software registering/managing system as set forth in claim 9, wherein said managing unit searches for temporary software information corresponding to the first software publication identifier stored in said storing unit and automatically deletes the temporary software information when the temporary software information has not been accessed for a predetermined time period.

12. The software registering/managing system as set forth in claim 7, wherein said storing unit has a database that stores information representing a relationship among the software information identifier, the original club identifier, and a linked club identifier identifying a club to which the software information was linked; and said managing unit references the database and displays a representation of a support club that supports a software program corresponding to the software information identifier on a screen of the terminal, whereby the user can move to the support club displayed on the terminal.

13. The software registering/managing system as set forth in claim 12, wherein said managing unit displays representations of a plurality of support clubs including the original club, with the original club being displayed in a first position and followed by the other support clubs.

14. The software registering/managing system as set forth in claim 1, wherein:

said managing unit receives a delivery request from a user through a club; and said installing unit installs a software program through the club receiving the delivery request.

15. A software registering/managing system, comprising:

a managing unit that manages software information received from a terminal coupled to a communication network, the software information having a standardized format and including fundamental information necessary for a database registering process, descriptive information containing a summary of a software program corresponding to the software information, and main information including a main body of the software program in a compressed format; and a storing unit that stores the software information.

16. The software registering/managing system as set forth in claim 15, further comprising an installing unit that installs the software program to a storage region of the terminal through the communication network, and wherein:

the software information further includes check information for checking an operating environment of the software program and install related information containing information relating to an install process; and said managing unit stores resultant software information to said storing unit when the software program is installed.

17. The software registering/managing system as set forth in claim 15, further comprising an automatic testing unit that determines validity of the software information in accordance with a check result of at least one of a syntax check, a virus check, a copyright check, a registered trademark check, and a software name redundancy check.

18. A terminal for use with a software registering system, comprising:

a storing unit that stores software information having a standardized format and including fundamental information necessary for a database registering process, descriptive information containing a summary of a software program corresponding to the software information, and main information including a main body of the software program in a compressed format; and an uploading unit that uploads the software information to a software registering center through a communication network.

19. A software registering/managing system, comprising:

a storing unit that stores a plurality of software programs in a database;

a communicating unit that communicates with respective terminals of a plurality of users through a communication network;

a managing unit that manages registered software programs as one or more program groups and includes a management module as a club for interacting with said system from the terminals, users connecting to the club to download software programs stored on the storing unit, the club providing a conference function for registering and managing the software programs; and an installing unit that installs a requested software program to a requesting terminal through the club; and wherein:

the club has a keyword with which the requested software program is searched from said storing unit, and at least one of a process for updating the requested software program, a process for publishing the requested software program, and a process for remotely installing the requested software program to the requesting terminal is performed through the club.

20. A computer-readable storage medium encoded with a program for delivering software programs to terminals of users through a communication network, said program comprising the functions of:

managing registered software programs as one or more program groups through a management module as a club for interacting with said system from the terminals, the club having a conference function for managing registered software programs and for electronically exchanging information between the users; and automatically installing to a storage region of a requesting terminal a software program corresponding to software information uploaded to the club.

21. The storage medium as set forth in claim 20, wherein said program further comprises the functions of:

managing the software programs through plurality of management modules as respective clubs in a hierarchy having a plurality of hierarchical levels including a lowest hierarchical level;

permitting a club in the lowest hierarchical level to upload the software information; and linking the uploaded software information to a club in a higher hierarchical level.

22. The storage medium as set forth in claim 20, wherein said program further comprises the functions of:

managing the software programs through a plurality of management modules as respective clubs;

managing the software information in accordance with the club to which the software information is uploaded, whereby the club serves as an original club for the software information; and linking the software information from the original club to a predetermined club, whereby users interacting with said system through the predetermined club can see the software information.

23. The storage medium as set forth in claim 20, wherein said program further comprises the functions of:

managing the software programs through a plurality of management modules as respective clubs;

managing the software information in accordance with the club to which the software information is uploaded, whereby the club serves as an original club for the software information; and moving an authority of the original club to a predetermined club, whereby users interacting with said system through the predetermined club can see the software information.

24. A method of registering and managing software programs, comprising the steps of:

managing registered software programs as one or more program groups through a management module as a first club for interacting with said system from a plurality of terminals, the first club having a conference function for managing registered software programs and for electronically exchanging information between respective users of the terminals;

registering software information to a database, the software information having been uploaded to the first club; and automatically installing to a storage region of a requesting terminal a software program corresponding to the software information when a user of the requesting terminal requests the software program.

25. The method as set forth in claim 24, further comprising the steps of:
    managing the software programs through a plurality of management modules as a respective plurality of clubs including the first club, the plurality of clubs having a hierarchical structure including a plurality of hierarchical levels including a lowest hierarchical level;
    permitting a club in the lowest hierarchical level to upload the software information; and
    linking the uploaded software information to a club in the higher hierarchical level.

26. The method as set forth in claim 24, further comprising the steps of:
    managing the software programs through a plurality of management modules as a respective plurality of clubs including the first club;
    managing the software information in accordance with the first club to which the software information is uploaded, whereby the first club serves as an original club for the software information; and
    linking the software information from the original club to a predetermined club, whereby users interacting with said system through the predetermined club can see the software information.

27. The method as set forth in claim 24, further comprising the steps of:
    managing the software programs through a plurality of management modules as a respective plurality of clubs including the first club;
    managing the software information in accordance with the first club to which the software information is uploaded, whereby the first club serves as an original club for the software information; and
    moving an authority of the original club to a predetermined club, whereby users interacting with said system through the predetermined club can see the software information.

28. A method for managing software programs received through a communication network from terminals of users, comprising the steps of:
    dividing software information to be registered into fundamental information necessary for a database registering process, descriptive information containing a summary of a software program corresponding to the software information, and main information including a main body of the software program in a compressed format; and
    formatting the fundamental information, the descriptive information, and the main information into a standard format and registering the formatted software information.

* * * * *